(12) United States Patent
Hu et al.

(10) Patent No.: US 9,897,901 B2
(45) Date of Patent: Feb. 20, 2018

(54) LIGHT SOURCE SYSTEM AND RELATED PROJECTION SYSTEM

(71) Applicant: APPOTRONICS CHINA CORPORATION, Shenzhen (CN)

(72) Inventors: Fei Hu, Shenzhen (CN); Yi Li, Pleasanton, CA (US); Liangliang Cao, Shenzhen (CN); Yi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/599,326

(22) Filed: May 18, 2017

(65) Prior Publication Data

US 2017/0255089 A1 Sep. 7, 2017

Related U.S. Application Data

(63) Continuation of application No. 14/432,018, filed as application No. PCT/CN2013/084025 on Sep. 23, 2013, now Pat. No. 9,746,756.

(30) Foreign Application Priority Data

Sep. 28, 2012 (CN) .......................... 2012 1 0370491

(51) Int. Cl.
*G03B 21/20* (2006.01)
*H04N 9/31* (2006.01)
(Continued)

(52) U.S. Cl.
CPC ............ *G03B 21/204* (2013.01); *F21V 14/08* (2013.01); *G02B 27/141* (2013.01);
(Continued)

(58) Field of Classification Search
CPC .............. G03B 21/204; G03B 21/2006; G03B 21/2013; G03B 21/2033; G03B 21/2066;
(Continued)

(56) References Cited

U.S. PATENT DOCUMENTS 5,517,340 A 5/1996 Doany et al.
5,612,753 A 3/1997 Poradish et al.
(Continued)

FOREIGN PATENT DOCUMENTS

CN 1224854 A 8/1999
CN 1300379 6/2001
(Continued)

OTHER PUBLICATIONS

Chinese Office Action in a counterpart application CN 201410394654.7, dated Dec. 3, 2015.
(Continued)

*Primary Examiner* — Bao-Luan Le
(74) *Attorney, Agent, or Firm* — Chen Yoshimura LLP

(57) ABSTRACT

A light source system comprises: a light-emitting device for emitting a first light and a second light in sequence; a beam splitting system with which the first light is divided into one beam in a first range of wavelength and the other beam in a second range of wavelength, respectively emitted along a first optical path and a second optical path, and also with which at least a part of the second light is emitted along the first optical path; a first spatial light modulator for modulating the beam emitted from the beam splitting system along the first optical path; a second spatial light modulator for modulating the beam emitted from the beam splitting system along the second optical path. The light source system has the advantages of high light-emitting efficiency and low cost. A projection system comprising the aforementioned light source system is also provided.

19 Claims, 19 Drawing Sheets

(51) Int. Cl.
  *G03B 33/08* (2006.01)
  *F21V 14/08* (2006.01)
  *G03B 21/00* (2006.01)
  *G02B 27/14* (2006.01)

(52) U.S. Cl.
  CPC ......... *G03B 21/005* (2013.01); *G03B 21/20* (2013.01); *G03B 21/206* (2013.01); *G03B 21/2013* (2013.01); *G03B 21/2033* (2013.01); *G03B 21/2066* (2013.01); *G03B 33/08* (2013.01); *H04N 9/312* (2013.01); *H04N 9/3105* (2013.01); *H04N 9/3114* (2013.01); *H04N 9/3117* (2013.01); *H04N 9/3158* (2013.01); *H04N 9/3164* (2013.01)

(58) Field of Classification Search
  CPC .............. G03B 21/2073; G03B 21/208; G03B 21/2093
  See application file for complete search history.

(56) References Cited

U.S. PATENT DOCUMENTS

| | | | |
|---|---|---|---|
| 5,863,125 A | 1/1999 | Doany | |
| 5,905,545 A | 5/1999 | Poradish | |
| 5,986,815 A | 11/1999 | Bryars | |
| 6,388,718 B1 | 5/2002 | Yoo et al. | |
| 6,536,902 B2 | 3/2003 | Lee | |
| 6,962,414 B2 | 11/2005 | Roth | |
| 7,029,129 B2 | 4/2006 | Shimada | |
| 7,077,524 B2 | 7/2006 | Roth | |
| 7,088,747 B2 | 8/2006 | Takiguchi et al. | |
| 7,113,343 B2 | 9/2006 | Kim et al. | |
| 7,118,221 B2 | 10/2006 | Shimada | |
| 7,177,084 B2 | 2/2007 | Kim et al. | |
| 7,178,923 B2 | 2/2007 | Imade | |
| 7,213,929 B2 | 5/2007 | Imade | |
| 7,234,823 B2 | 6/2007 | Imade | |
| 7,237,899 B2 | 7/2007 | Ma et al. | |
| 7,237,910 B2 | 7/2007 | Kumai | |
| 7,287,858 B2 | 10/2007 | Kim et al. | |
| 7,289,090 B2 | 10/2007 | Morgan | |
| 7,303,284 B2 | 12/2007 | Imade | |
| 7,334,897 B2 | 2/2008 | Silverstein et al. | |
| 7,347,562 B2 | 3/2008 | Greenberg et al. | |
| 7,364,302 B2 | 4/2008 | Conner | |
| 7,364,305 B2 | 4/2008 | Itoh | |
| 7,429,111 B2 | 9/2008 | Ockenfuss | |
| 7,452,087 B2 | 11/2008 | Imade | |
| 7,506,985 B2 | 3/2009 | Radominski et al. | |
| 7,570,410 B2 | 8/2009 | Pettitt | |
| 7,740,382 B2 | 6/2010 | Chen et al. | |
| 7,883,216 B2 | 2/2011 | Yang | |
| 7,954,960 B2 | 6/2011 | Shirai et al. | |
| 7,956,938 B2 | 6/2011 | Muramoto | |
| 8,047,658 B2 | 11/2011 | Yang | |
| 8,061,846 B2 | 11/2011 | Shirai et al. | |
| 8,226,246 B2 | 7/2012 | Shirai et al. | |
| 8,272,749 B2 | 9/2012 | Yoon | |
| 8,334,935 B2 | 12/2012 | Yoon | |
| 8,348,432 B2 | 1/2013 | Miyazaki | |
| 8,382,288 B2 | 2/2013 | Narimatsu et al. | |
| 8,562,146 B2 | 10/2013 | Kitano et al. | |
| 8,585,208 B2 | 11/2013 | Akiyama | |
| 8,596,795 B2 | 12/2013 | Akiyama | |
| 8,628,199 B2 | 1/2014 | Akiyama | |
| 8,662,673 B2 | 3/2014 | Miyazaki | |
| 8,662,678 B2 | 3/2014 | Hirata et al. | |
| 8,678,596 B2 | 3/2014 | Sakata et al. | |
| 8,690,343 B2 | 4/2014 | Tanaka et al. | |
| 8,801,192 B2* | 8/2014 | Wang .................. | G03B 21/2013 348/743 |
| 8,840,253 B2* | 9/2014 | Kitano .................. | H04N 9/3111 348/339 |
| 8,858,000 B2 | 10/2014 | Tsuda et al. | |
| 8,870,387 B2 | 10/2014 | Toyooka et al. | |
| 8,911,092 B2* | 12/2014 | Fujita .................. | G03B 21/204 353/31 |
| 8,915,597 B2 | 12/2014 | Kitano et al. | |
| 8,926,109 B2* | 1/2015 | Lin .................. | G03B 21/204 362/231 |
| 8,974,064 B2 | 3/2015 | Maeda | |
| 9,010,938 B2 | 4/2015 | Akiyama | |
| 9,024,241 B2 | 5/2015 | Wang et al. | |
| 9,075,299 B2* | 7/2015 | Hu .................. | H04N 9/3158 |
| 9,185,372 B2* | 11/2015 | Takahashi ............ | H04N 9/3114 |
| 9,274,406 B2 | 3/2016 | Toyooka et al. | |
| 9,300,929 B2 | 3/2016 | Kashiwagi et al. | |
| 9,304,382 B2 | 4/2016 | Toyooka et al. | |
| 9,323,139 B2 | 4/2016 | Zakoji | |
| 9,341,930 B2 | 5/2016 | Zakoji et al. | |
| 2004/0057472 A1 | 3/2004 | Takiguchi et al. | |
| 2004/0090602 A1 | 5/2004 | Imade | |
| 2004/0233342 A1 | 11/2004 | Kim et al. | |
| 2004/0246589 A1 | 12/2004 | Kim et al. | |
| 2005/0012902 A1 | 1/2005 | Kim et al. | |
| 2005/0012904 A1 | 1/2005 | Kim et al. | |
| 2005/0068503 A1 | 3/2005 | Imade | |
| 2005/0128441 A1 | 6/2005 | Morgan | |
| 2005/0140937 A1 | 6/2005 | Kumai | |
| 2005/0157274 A1 | 7/2005 | Lin | |
| 2005/0168701 A1 | 8/2005 | Shimada | |
| 2005/0206846 A1 | 9/2005 | Yeung et al. | |
| 2005/0248736 A1 | 11/2005 | Itoh | |
| 2005/0259225 A1 | 11/2005 | Greenberg et al. | |
| 2006/0007412 A1 | 1/2006 | Kumai | |
| 2006/0098171 A1 | 5/2006 | Shimada | |
| 2006/0119797 A1 | 6/2006 | Ockenfuss | |
| 2006/0152691 A1 | 7/2006 | Imade | |
| 2006/0244931 A1 | 11/2006 | Imade | |
| 2006/0279709 A1 | 12/2006 | Yamamoto | |
| 2006/0279710 A1 | 12/2006 | Tani | |
| 2007/0002283 A1 | 1/2007 | Shimada | |
| 2007/0091281 A1 | 4/2007 | Radominski et al. | |
| 2007/0109501 A1 | 5/2007 | Imade | |
| 2007/0121086 A1 | 5/2007 | Imade | |
| 2007/0188718 A1 | 8/2007 | Yang | |
| 2008/0024730 A1 | 1/2008 | Kim et al. | |
| 2008/0158516 A1 | 7/2008 | Pettitt | |
| 2008/0239717 A1 | 10/2008 | Chen et al. | |
| 2008/0266470 A1 | 10/2008 | Muramoto | |
| 2009/0059557 A1 | 3/2009 | Tanaka | |
| 2009/0141036 A1 | 6/2009 | Shirai et al. | |
| 2009/0141188 A1 | 6/2009 | Shirai et al. | |
| 2010/0026910 A1 | 2/2010 | Yoon | |
| 2010/0091118 A1 | 4/2010 | Fujinawa | |
| 2010/0156958 A1 | 6/2010 | Yang | |
| 2010/0165298 A1 | 7/2010 | Imade | |
| 2010/0328627 A1 | 12/2010 | Miyazaki | |
| 2010/0328628 A1 | 12/2010 | Masuda | |
| 2011/0051095 A1 | 3/2011 | Narimatsu | |
| 2011/0199580 A1 | 8/2011 | Hirata et al. | |
| 2011/0228232 A1 | 9/2011 | Sakata et al. | |
| 2012/0002173 A1 | 1/2012 | Akiyama | |
| 2012/0008098 A1 | 1/2012 | Akiyama | |
| 2012/0026469 A1 | 2/2012 | Akiyama | |
| 2012/0050691 A1 | 3/2012 | Tsuda et al. | |
| 2012/0069269 A1 | 3/2012 | Yang | |
| 2012/0099084 A1 | 4/2012 | Toyooka et al. | |
| 2012/0106126 A1 | 5/2012 | Nojima et al. | |
| 2012/0127435 A1 | 5/2012 | Kitano et al. | |
| 2012/0133903 A1 | 5/2012 | Tanaka | |
| 2012/0154766 A1 | 6/2012 | Choi et al. | |
| 2012/0188516 A1 | 7/2012 | Kashiwagi | |
| 2012/0206697 A1 | 8/2012 | Lee | |
| 2012/0236264 A1 | 9/2012 | Akiyama | |
| 2012/0242912 A1* | 9/2012 | Kitano .................. | H04N 9/3111 348/759 |
| 2012/0243205 A1* | 9/2012 | Lin .................. | G03B 21/204 362/84 |
| 2012/0268917 A1 | 10/2012 | Kitano et al. | |
| 2012/0299801 A1 | 11/2012 | Kitano | |
| 2012/0320355 A1 | 12/2012 | Maeda | |

(56) References Cited

U.S. PATENT DOCUMENTS

| | | | |
|---|---|---|---|
| 2013/0010264 A1* | 1/2013 | Takahashi | H04N 9/3114 353/20 |
| 2013/0021582 A1* | 1/2013 | Fujita | G03B 21/204 353/31 |
| 2013/0038841 A1 | 2/2013 | Zakoji et al. | |
| 2013/0038842 A1 | 2/2013 | Zakoji | |
| 2013/0077055 A1 | 3/2013 | Wang et al. | |
| 2013/0088690 A1* | 4/2013 | Wang | G03B 21/2013 353/31 |
| 2013/0107223 A1 | 5/2013 | Toyooka | |
| 2013/0107225 A1 | 5/2013 | Miyazaki | |
| 2013/0229631 A1 | 9/2013 | Toyooka et al. | |
| 2013/0229634 A1* | 9/2013 | Hu | G03B 21/204 353/84 |
| 2013/0250546 A1* | 9/2013 | Hu | F21V 9/08 362/84 |
| 2013/0258639 A1* | 10/2013 | Hu | F21V 9/08 362/84 |
| 2013/0271954 A1* | 10/2013 | Li | H04N 9/3114 362/84 |
| 2013/0293850 A1 | 11/2013 | Masuda | |
| 2015/0253653 A1* | 9/2015 | Fujita | H04N 9/3111 353/31 |
| 2016/0062220 A1 | 3/2016 | Kato | |

FOREIGN PATENT DOCUMENTS

| | | |
|---|---|---|
| CN | 1482487 A | 3/2004 |
| CN | 101144940 A | 3/2008 |
| CN | 201654428 U | 11/2010 |
| CN | 101937127 | 1/2011 |
| CN | 201974582 U | 9/2011 |
| CN | 102253581 A | 11/2011 |
| CN | 102608855 A | 7/2012 |
| CN | 102645822 | 8/2012 |
| CN | 102645826 | 8/2012 |
| CN | 102650811 A | 8/2012 |
| CN | 204595412 U | 8/2015 |
| EP | 2749943 | 7/2014 |
| EP | 2787390 | 10/2014 |
| JP | 2000-347323 | 12/2000 |
| JP | 2001-166275 | 6/2001 |
| JP | 2005-352476 | 12/2005 |
| JP | 2010-078766 | 4/2010 |
| JP | 2011028228 | 2/2011 |
| JP | 2012-123179 | 6/2012 |
| JP | 2014-021223 | 2/2014 |
| TW | 201234097 | 8/2012 |
| WO | 0038432 | 6/2000 |

OTHER PUBLICATIONS

Chinese Office Action in a counterpart application CN 201410391951.6, dated Nov. 27, 2015.
Japanese Office Action, in a counterpart application JP 2015-533429, dated Jan. 22, 2016.
Japanese Office Action, in a counterpart application JP 2015-533429, dated Oct. 4, 2016.
Korean Office Action, in a counterpart application KR 10-2015-7008297, dated Apr. 14, 2016.
Korean Office Action, in a counterpart application KR 10-2015-7008297, dated Oct. 28, 2016.
Korean Office Action, in a counterpart application KR 10-2015-7008297, dated Jan. 9, 2017.
Chinese Office Action, dated Apr. 3, 2015, in a counterpart Chinese patent application, No. CN 201210370655.9.
International Search Report in the parent PCT application No. PCT/CN2013/084025, dated Nov. 28, 2013.
IPRP in the parent PCT application No. PCT/CN2013/084025, dated Mar. 31, 2015.
Extended European Search Report in corresponding application EP 13842711.7, dated Sep. 9, 2016.
Supplementary European Search Report in corresponding application EP 13842711.7, dated May 6, 2016.

* cited by examiner

LIGHT SOURCE SYSTEM AND RELATED PROJECTION SYSTEM

BACKGROUND OF THE INVENTION

Field of the Invention

This invention relates to lighting and display technologies, and in particular, it relates to a light source system and related projection system.

Description of the Related Art

In conventional single-plate digital micromirror device (DMD) system, multiple primary lights sequentially and alternatingly enters the DMD to be modulated. The modulated single-color images rapidly switch on the screen, so that a color image is perceived by the viewer due to mixing of the sequential single-color images by the effect of persistence of vision of the human eyes. In conventional technologies, typically red (R), green (G) and blue (B) primary color lights are used for modulation. A commonly used method of generating a three primary color light sequence is to use an excitation light to excite different segments of a color wheel sequentially to generate different color lights sequentially. In such a structure, the excitation light may employ a blue LED (light emitting diode) or blue laser. The color wheel has three segments, one of which being a light transmitting segment which transmits the blue light, while the other two carry green and red phosphors, respectively, to absorb the excitation light and generate green and red converted lights, respectively.

However, in such a light source device that uses phosphors, red phosphor is a bottleneck that limits that working life and light emission efficiency of the light source device. The wavelength conversion efficiency of red phosphor tends to be relatively low; the energy not converted to red light becomes heat, which quickly raises the temperature of the phosphor, which in turn adversely affects its light emitting efficiency and life, causing a vicious cycle.

SUMMARY OF THE INVENTION

The main technical problem solved by this invention is to provide a light source system that has high light emitting efficiency and relatively low cost.

An embodiment of the present invention provides a light source system, which includes:

a light generating device which sequentially generates a first light and a second light;

a light division system which divides the first light from the light generating device into a light in a first wavelength range and a light in a second wavelength range and outputs them along a first light path and a second light path, respectively, and which outputs at least a part of the second light from the light generating device along the first light path;

a first spatial light modulator, which modulates the light outputted from the first light path of the light division system; and a second spatial light modulator, which modulates at least a part of the light outputted from the second light path of the light division system.

Another embodiment of the present invention provides a projection system that includes the above light source system.

Compared to conventional technologies, the light source system according to embodiments of the present invention has the following advantages:

It divides the first light into the light in the first wavelength range and the light in the second wavelength range, and these two lights and the at least part of the second light are outputted sequentially; thus, in certain time intervals only two lights are output, and in certain other time intervals only one light is output, so that two spatial light modulators can be used to modulate the three lights. Further, the light source system can use a wavelength conversion material having a relatively high wavelength conversion efficiency to generate a converted light and then divide that converted light into two other colors, where the two other color lights would otherwise have required two wavelength conversion material having relatively low wavelength conversion efficiency; this increases the efficiency of the light source system.

DETAILED DESCRIPTION OF THE PREFERRED EMBODIMENTS

A principle of the various embodiments of the present invention include the following: a light generating device sequentially outputs a first light and a second light; a light division system divides the first light into two lights which fall in two different wavelength ranges and travel along two different light paths. This way, in certain time intervals, two lights in different wavelength ranges are output to two spatial light modulators, and in certain other time intervals, at least a part of the second light is output to one of the two spatial light modulators, so that the two spatial light modulators can respectively modulate three different lights. In the mean time, a yellow phosphor, which has a relatively high wavelength conversion efficiency, is used to generate a yellow light which is then divided into a red light and a green light; this avoids the use of red phosphors which has relatively low wavelength conversion efficiency, thereby increasing the efficiency of the light source system.

Figure 1:
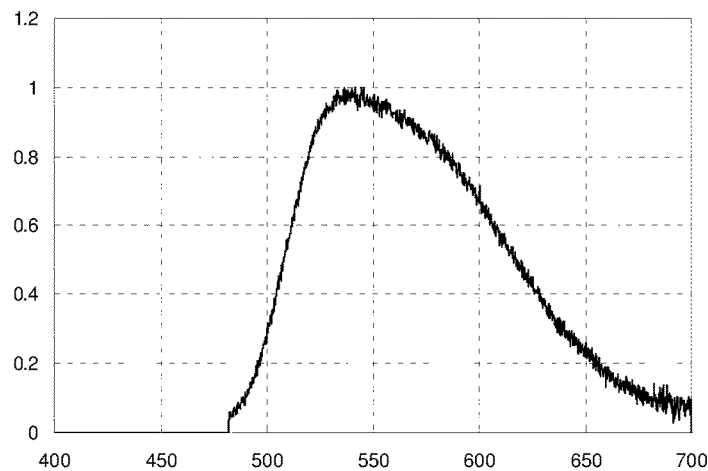
FIG. 1 shows the spectrum of a yellow light generated by a yellow phosphor.

FIG. 1 illustrates an exemplary spectrum of a yellow light generated by a yellow phosphor. It can be seen that the yellow light has a relatively wide spectrum, covering the red and green spectral ranges. Thus, the yellow light can be divided into a red light and a green light. For convenience of description, the yellow spectrum describe below refers to such a yellow light that covers the red and green spectrum, which can be divided by a light division device into a red light and a green light traveling in different directions.

Embodiments of the present invention are described below with reference to the drawings.

First Embodiment

Figure 2:
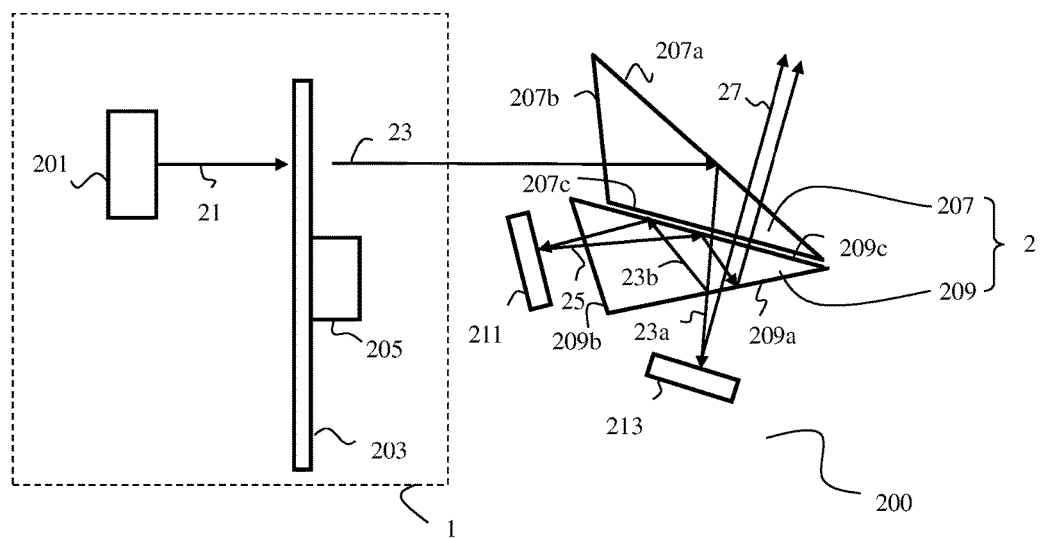
FIG. 2 schematically illustrates a light source system according to an embodiment of the present invention.

Referring to FIG. 2, which schematically illustrates a light source system according to an embodiment of the present invention. The light source system of this embodiment includes a light generating device 1, a light division system 2, a first spatial light modulator 211, and a second spatial light modulator 213.

The light generating device 1 includes an excitation light source 201 for generating an excitation light, a wavelength conversion layer 203, and a first drive device 205. The wavelength conversion layer 203 includes a first segment and a second segment. The first segment is provided with a first wavelength conversion material that absorbs the excitation light and emits a first light; the second segment is a light transmitting segment, which transmits the excitation light as a second light. In this embodiment, the excitation light source 201 generates a blue excitation light. The excitation light source 201 is preferably a laser source, but can also be an LED or other solid-state light source. The first segment of the wavelength conversion layer 203 is provided with a yellow phosphor, for absorbing the excitation light and generating a yellow converted light as the first light. The second segment is a light transmitting segment, which transmits the blue light as the second light. The wavelength conversion layer 203 is disk shaped, and the different segments of the wavelength conversion layer are distributed in a circumferential direction on the disk.

The first drive device 205 drives the wavelength conversion layer 203, such that the excitation light forms a light spot on the wavelength conversion layer 203 which falls on different segments of the wavelength conversion layer 203 along a predetermined path. The excitation light spot sequentially illuminates the first segment and second segment, so that the first light and second light are outputted sequentially. In this embodiment, the first drive device 205 is a motor that drives the wavelength conversion layer 203 to rotate.

The light division system 2 divides the first light from the light generating device 1 into a light in a first wavelength range and a light in a second wavelength range which are output along a first light path and second light path, respectively. It also outputs at least a part of the second light from the light generating device 1 along the first light path. The first spatial light modulator 211 modulates the light outputted from the first light path of the light division system; the second spatial light modulator 213 modulates at least a part of the light outputted from the second light path of the light division system. The light modulated by the first spatial light modulator 211 and the second spatial light modulator 213 are combined and outputted to the projection area.

In this embodiment, the light division system 2 divides the yellow light into a green line as the light in the first wavelength range, and a red light as the light in the second wavelength range. In the following examples, when the yellow first light is divided into green light and red light, the light in the first wavelength range and light in the second wavelength range are not necessarily green light and red light, respectively; these two wavelength ranges are relative concepts, and the light in the first wavelength range and light in the second wavelength range may also the red light and green light, respectively.

The first spatial light modulator 211 modulates a light sequence of blue and green lights, and the second spatial light modulator 213 modulates the red light. Because the yellow phosphor has a high light conversion efficiency, and because the blue light is directly generated by a light emitting device, using the blue light to excite the yellow phosphor to generate the three primary colors results in a high efficiency light source system.

In one implementation, the light division system 2 includes a combination of total internal reflection (TIR) prisms 207 and 209. Each of the two prisms is a rod having a triangular cross-section; the side faces of the first prism 207 are 207a, 207b and 207c, and the side faces of the second prism 209 are 209a, 209b and 209c. The side face 207c of the first prism 207 is joined with the side face 209c of the second prism 209.

The excited light 23 outputted by the wavelength conversion layer 203 enters the first prism 207 from the side face 207b, is reflected by total internal reflection on the side face 207a, passes through the side face 207c to enter the second prism 209 from the side face 209c, and reaches the side face 209a. The side face 209a is coated with a filter film which transmits red light and reflects blue and green light. The light sequence of blue and green light is reflected by the coated surface 209a, then reflected by the face 209c by total internal reflection, before passing through the face 209b and entering the first spatial light modulator 211 via the first light path. The modulated blue and green lights is incident on the side face 209b and passes through it, is reflected on the side face 209c by total internal reflection and then reflected by the coated surface 209a, before passing through the side face 209c and passing through the prism 207. The red light passes through the coated surface 209a to enter the second spatial light modulator 213 via the second light path. The modulated red light passes through the second prism 209 and first prism 207 in turn, and is combined with the modulated green light into one light beam.

Each spatial light modulator may be a DMD, or liquid crystal or other types of spatial light modulator. The embodiments below use DMD as an example.

Figure 3A:
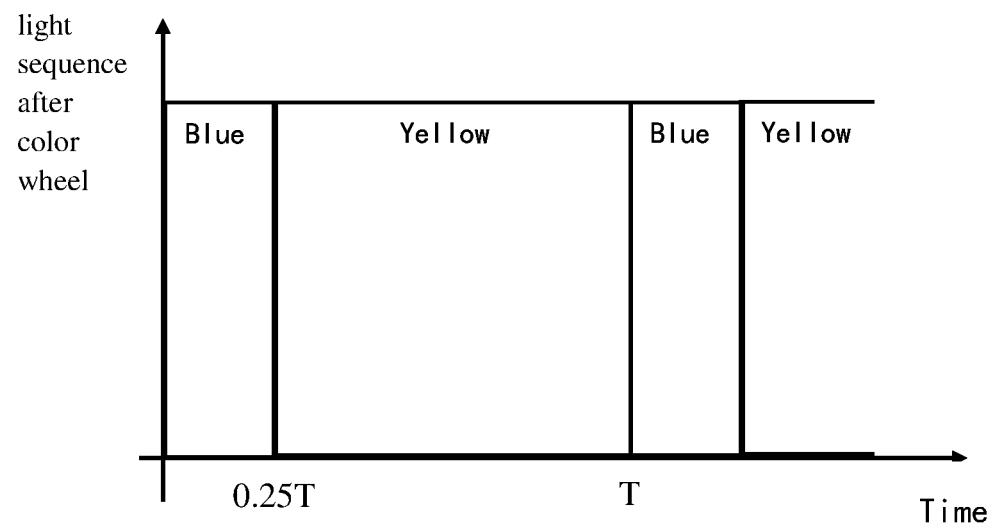
FIG. 3A illustrates an example of the time sequence of the color light outputted by the wavelength conversion layer 203 in FIG. 2.
Figure 3B:
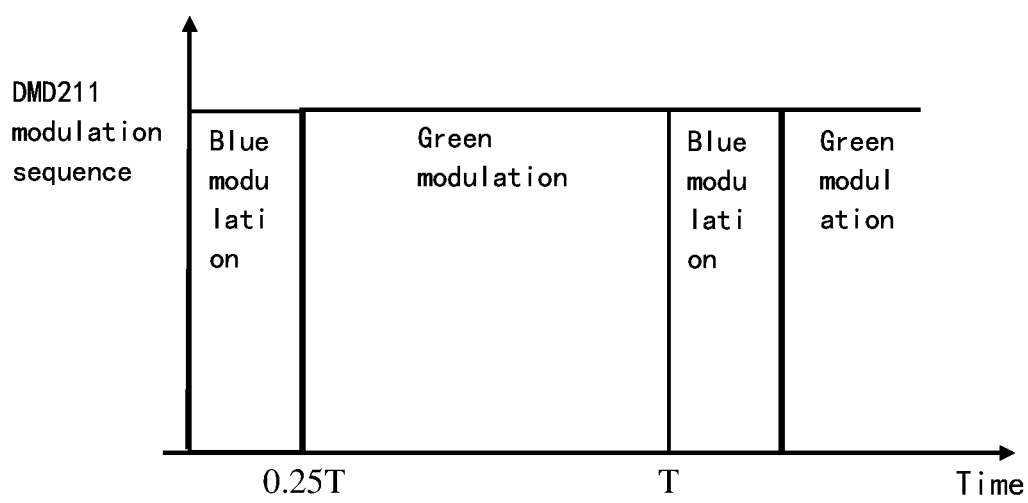
FIGS. 3B and 3C respectively illustrate examples of the modulation time sequences of the DMD 211 and DMD 213 in FIG. 2, respectively, for different color lights.
Figure 3C:
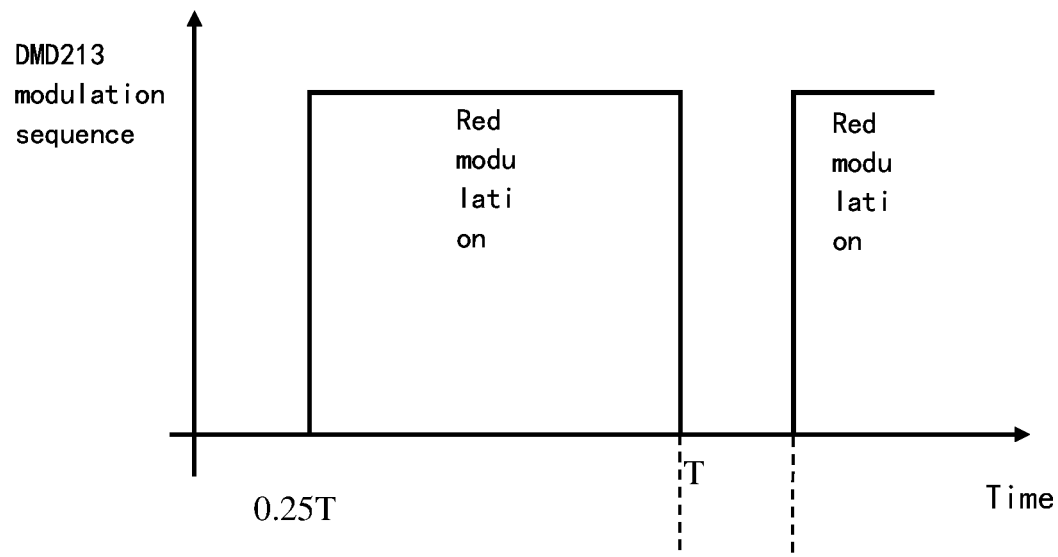
Figure 4:
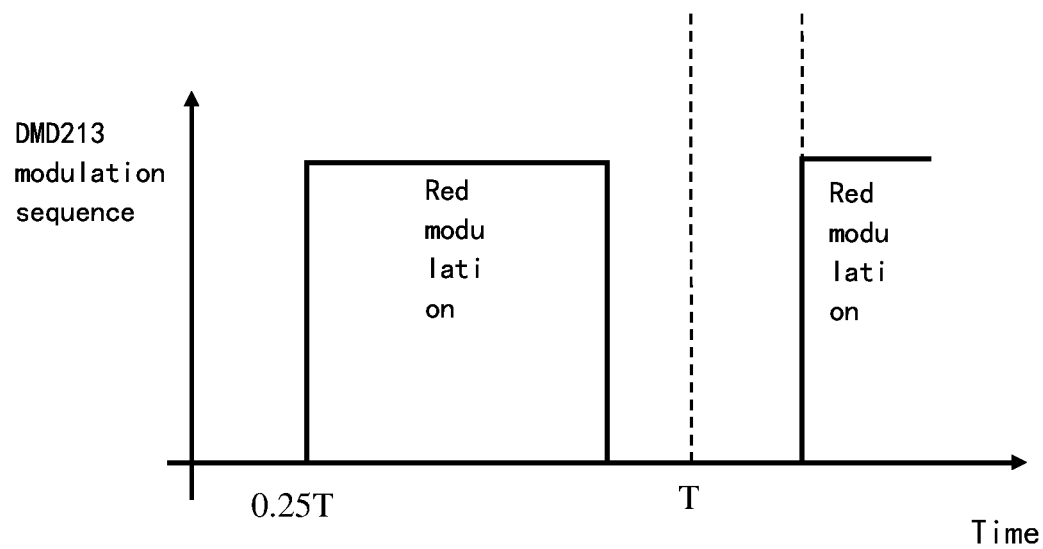
FIG. 4 illustrates another example of the modulation time sequence of the DMD 213 for red light.

Refer to FIG. 3A, which illustrates an example of the time sequence of the color light outputted by the wavelength conversion layer 203 in FIG. 2. In this embodiment, the first segment of the wavelength conversion layer 203 occupies 270 degrees and the second segment occupies 90 degrees. From a starting time point where the second segment of the wavelength conversion layer 203 begins to enter the input path of the excitation light, within a period T of the rotation of the wavelength conversion layer 203, the operation of the light source system is as follows. In the first 0.25T period, the wavelength conversion layer 203 outputs a blue light; in the last 0.75T period, it outputs a yellow light. Correspondingly, in the first 0.25T, the DMD 211 operates to modulate the blue light, and the DMD 213 does not operate. In the last 0.75T, the DMD 211 operates to modulate the green light, and the DMD 213 operates to modulate the red light. Refer to FIGS. 3B and 3C, which respectively illustrate the modulation time sequences of the DMD 211 and DMD 213, respectively, for different color lights. Under this operation condition, in each period T, the red light and green light are fully utilized, and the utilization of the light source is maximized. However, this may not be the case in actual operation, because it is possible that a white light formed by mixing such three primary color lights may have color coordinates that do not meet predetermined color coordinates requirements. In actual operation, the two DMDs may be used to vary the lengths of modulation times for each color to control the color coordinates of the resulting white light. For example, in one implementation, if the red light is too strong and causes the resulting white light to have a red tint to it, the DMD 213 may be controlled to shorten the modulation time so that in a certain time period the red light is not output. Refer to FIG. 4, which illustrates another example of the operating time sequence of the DMD 213 for red light. In the FIG. 4, the red light is discarded in a time interval near the end of each time period T. In practice, the red light may be discarded in a time interval near the beginning of the period T or in one or more time intervals anywhere within the period T.

Further, the above ratios of the first segment and second segment are only examples; the ratios can be determined by practical considerations and are not limited to the above examples.

In this embodiment, the light generating device sequentially outputs the first light and the second light, and a light division system divides the first light into two lights of different wavelength ranges and different traveling directions. This way, within certain time periods two lights of different wavelength ranges are outputted to two different spatial light modulators, and within another time period at least a part of the second light is outputted to one of the tow spatial light modulators, so that the two spatial light modulators can modulate three different lights.

In practical applications, the TR prism 209 of the light division system 2 may also have its face 209a coated with a filter film that transmits green and blue light and reflects red light. In this situation, the DMD 211 may be used to modulate red light and the DMD 213 may be used to modulate green and blue lights. As another alternative, the filter film on the face 209a may be one that transmits green light and reflects red and blue light. In this situation, the DMD 211 may be used to modulate red and blue lights and the DMD 213 may be used to modulate green light. The filtering spectrum of the film on face 209a may be designed based on practical needs.

The above-described light paths of the converted light in the two TIR prisms are only examples; different TIR prisms may be used as well.

In the above embodiment, two prisms are used to both divide the yellow light into red and green lights and combine the two modulated lights from the two DMDs into a combined light. In practice, a dichroic filter plate may be used to divide the yellow light, and downstream from the two DMDs, a dichroic filter plate may be used to combine the modulated light.

Second Embodiment

Figure 5:
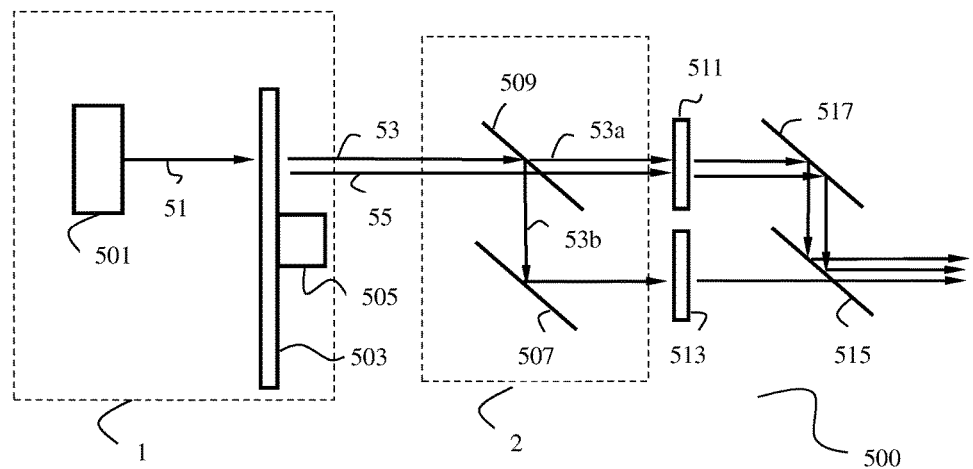
FIG. 5 schematically illustrates a light source system according to another embodiment of the present invention.

Refer to FIG. 5, which schematically illustrates a light source system according to another embodiment of the present invention. In this embodiment, the light source system 500 includes a light generating device 1, a light division system 2, a first spatial light modulator 511 and a second spatial light modulator 513. The light generating device 1 includes an excitation light source 501, a wavelength conversion layer 503 and a first drive device 505.

Differences between this embodiment and the embodiment of FIG. 2 include:

The light division system 2 includes a filter plate 509 and a reflector 507. The filter plate 509 receives the yellow light 53 and blue light 55 sequentially outputted by the wavelength conversion layer 503; it transmits the blue light 55 and the green component 53a of the yellow light 53 and outputs them to the DMD 511 via a first light path, and reflects the red component 53b of the yellow light 53 to the reflector 507. The reflector 507 reflects the red light 53b via the second light path to the DMD 513.

Preferably, the light source system 500 further includes a filter plate 515 and reflector 517 disposed respectively on the output path of the DMD 511 and DMD 513. The reflector 517 reflects the light sequence of blue and green lights modulated by the DMD 511 to the filter plate 515. The filter plate 515 reflects the blue and green lights from the reflector 517, and transmits the red light from the DMD 513, to combine the output lights of the DMD 511 and DMD 513 into one beam of light. It should be understood that in other embodiment, the output angles of the DMD 511 and DMD 513 may be adjusted to combine these two output lights into one beam. Further, in some applications, it is not necessary to combine the output lights of the DMD 511 and DMD 513 into one beam, so the reflector 517 and filter plate 515 can be omitted.

Third Embodiment

Figure 6:
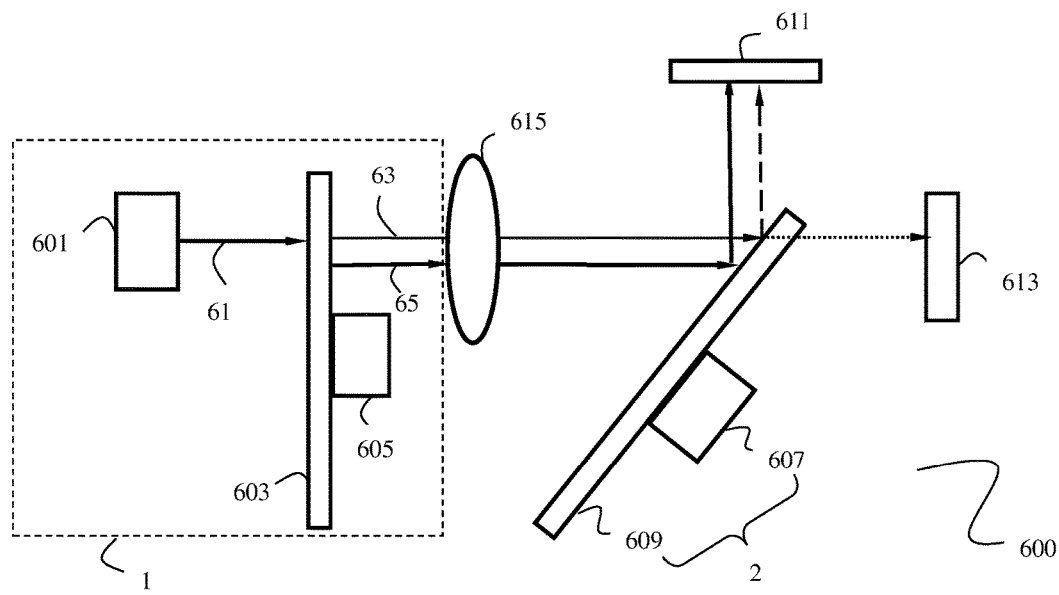
FIG. 6 schematically illustrates a light source system according to another embodiment of the present invention.

Refer to FIG. 6, which schematically illustrates a light source system according to another embodiment of the present invention. In this embodiment, the light source system 600 includes a light generating device 1, a light division system 2, a first spatial light modulator 611 and a second spatial light modulator 613. The light generating device 1 includes an excitation light source 601, a wavelength conversion layer 603 and a first drive device 605.

Differences between this embodiment and the embodiment of FIG. 5 include:

The light division system 2 includes a first light division device 609, a second drive decide 607, and a first control device (not shown in the drawing). To increase the utilization efficiency of the output light of the light generating device 1, the light source system 600 additionally includes a light collecting lens 615 disposed on the light path between the light generating device 1 and the light division system 2, for collecting the light sequence of yellow light 63 and blue light 65 from the light generating device, and to relay the collected light to the first light division device 609. The first light division device 609 has a disk shape which is divided into a first segment and a second segment in the circumferential direction. The second drive device 607 drives the first light division device 609 so that the first and second segments are sequentially disposed on the output path of the light generating device 1. The first control device controls the rotation of the first drive device 605 and the second drive device 607, so that the first light division device 609 and the wavelength conversion layer 603 rotate synchronously; as a result, the first segment is located on the output path of the first light, i.e. the yellow light 63, and the second segment is located on the output path of the second light, i.e. the blue light 65.

The first segment of the first light division device 609 transmits the green component of the yellow light 63 and outputs it via the second light path to the DMD 613, and reflects the red component of the yellow light 63 and outputs it via the first light path to the DMD 611. The second segment reflects the blue light 65 and outputs via the first light path to the DMD 611. Of course, in practice, alternatively, the first segment may reflect red and transmit green light; or, the second segment may transmit a part of the blue light and reflects a part of it, and the transmitted and reflected blue lights may respectively be modulated by the DMD 611 and DMD 613, or the DMDs may modulate one of the two blue lights.

Fourth Embodiment

Figure 7:
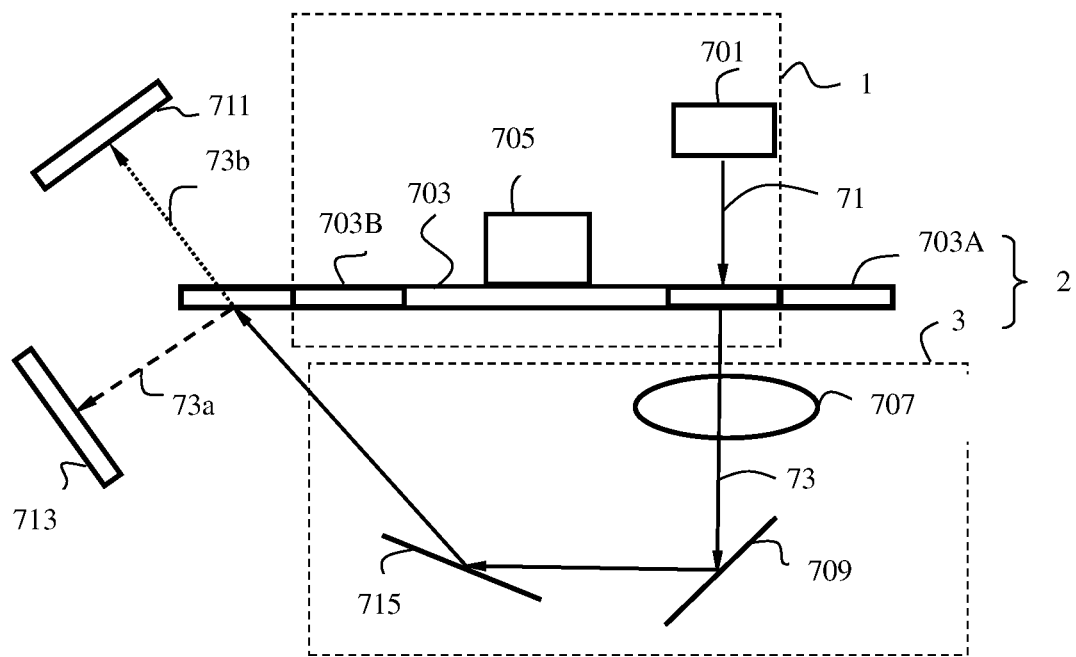
FIG. 7 schematically illustrates a light source system according to another embodiment of the present invention.

Refer to FIG. 7, which schematically illustrates a light source system according to another embodiment of the present invention. In this embodiment, the light source system 700 includes a light generating device 1, a light division system 2, a first spatial light modulator 711 and a second spatial light modulator 713. The light generating device 1 includes an excitation light source 701, a wavelength conversion layer 703B and a first drive device 705. The light division system 2 includes a first light division device 703A and a light guiding device 3.

Figure 8:
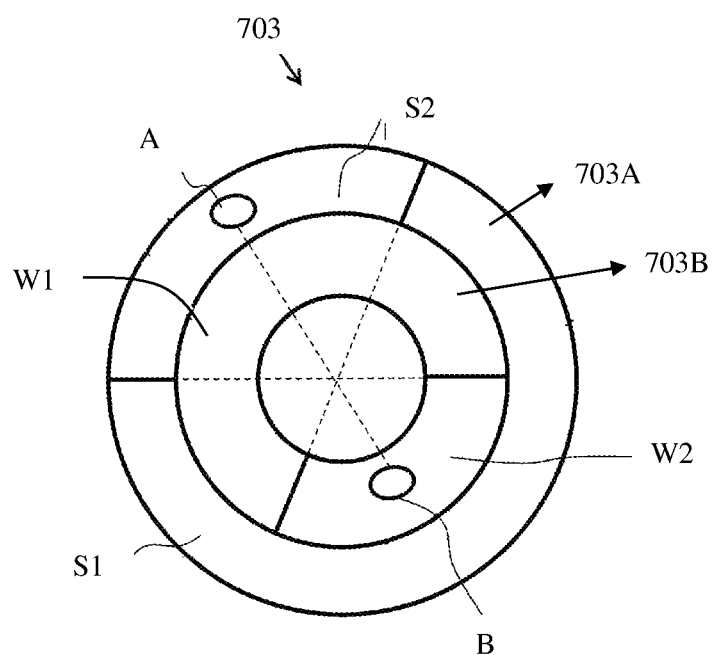
FIG. 8 is a plan view of an example of the color wheel 703 in FIG. 7.

Differences between this embodiment and the embodiment of FIG. 6 include:

In this embodiment, the wavelength conversion layer 703B and the first light division device 703A are fixedly connected, and mounted on the color wheel 703. Refer to FIG. 8, which is a plan view of an example of the color wheel 703 in FIG. 7. The color wheel 703 are provided with two concentric and nested ring-shaped regions 703A and 703B, where the ring 703A is the light division region, i.e., the first light division device, and the ring 703B is the wavelength conversion region, i.e. the wavelength conversion layer. The light division region 703A includes a first segment S1 which transmits the green light and outputs it to the first light path and reflects the red light and outputs it to the second light path. The light division region 703A also includes a second segment S2 which transmits the blue light and outputs it to the first light path. The wavelength conversion region 703B includes a first segment W1, which carries a yellow wavelength conversion material to generate a yellow converted light. This segment is disposed at a 180-degree position from the first segment S1 of the light division region 703A with respect to the ring center. The wavelength conversion region 703B also includes a second segment W2, which is a transmission regions that transmits the blue light. This segment is disposed at a 180-degree position from the second segment S2 of the light division region 703A with respect to the ring center. The first drive device 705 drives the color wheel 703 to rotate, such that the first segment W1 and second segment W2 are sequentially disposed on the output path of the light generating device 1.

The light guiding device 3 guides the sequence of output lights from the first segment W1 and second segment W2 of the wavelength conversion layer 703B respectively to the first segment S1 and second segment S2 of the first light division region 703A, in the following manner.

In this embodiment, the light guiding device 3 includes a lens 707 and reflectors 709 and 715. Within a rotation period T of the color wheel 703, during the first time interval t1, the excitation light 71 from the excitation light source 701 is incident on the first segment W1 of the wavelength conversion layer 703B and a yellow converted light is generated; this output converted light 73 exits the side of the wavelength conversion layer 703B that faces away from the excitation light, and is collected by the lens 707. The light is then reflected in turn by reflectors 709 and 715, and then incident on the first segment S1 of the light division region 703A at a 45 degree incident angle. The green component and red component of the yellow light are respectively transmitted and reflected by the first segment S1, and respectively outputted to the DMD 711 along the first light path and to the DMD 713 along the second light path.

During a later time interval t2, the excitation light 71 is incident on the segment W2 and a blue light is output. This light is guided by the light guiding device 3 to incident on the second segment S2 at a 45 degree angle, transmitted through it, and then enters the DMD 711 along the second light path. The line connecting the light spot A formed by the excitation light 71 on the light division region 703A and the light spot B formed on the wavelength conversion layer 703B pass through the ring center. Of course, in practice, the incident angle when the output light 73 enters the light division region 703A may be other than 45 degrees, and can be any angle greater than 0 depending on practical needs.

Hence, compared to the light source system of FIG. 6, here the wavelength conversion layer and the first light division device can rotate synchronously, increasing their synchrony and eliminating the need for a control device to control their synchronous motion, which reduces cost and the system's size.

Fifth Embodiment

Figure 9:
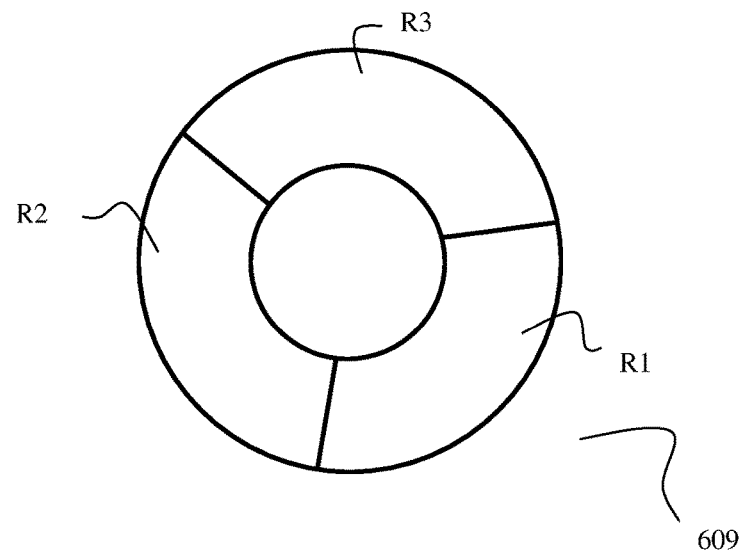
FIG. 9 is a plan view of an example of the light division device 609 in FIG. 6.

Refer to FIG. 9, which is a plan view of an example of the light division device 609 in FIG. 6. Different from the light source system of FIG. 6, in this embodiment the first light division device 609 includes three segments. The first segment R1 transmits the red light to output it via the first light path, and reflects green light to output it via the second light path. The second segment R2 transmits green light to output it via the first light path, and reflects red light to output it via the second light path. The third segment transmits a part of the blue light to output it via the first light path, and reflects a part of the blue light to output it via the second light path.

Correspondingly, the first control device controls the first light division device 609, so that the first segment R1 and the second segment R2 are located on the output path of the first light, and the third segment is located on the output path of the second light. More specifically, during the time period T where the yellow light it output, in a first time interval t1, the first segment R1 is located on the output path of the yellow light, and during a later time interval t2, the second segment R2 is located on the output path of the yellow light; and when the blue light is output, the third segment R3 is located on the output path of the blue light.

In this embodiment, within the time period when the wavelength conversion layer 603 rotates to generate a sequence of yellow (Y) and blue (B) lights, the DMD 611 sequentially receives a light sequence of green (G), red (R) and blue (B) lights, and the DMD 613 sequentially receives a light sequence of R, G and B lights. Therefore, compared to other embodiments described above, in this embodiment, the two DMD can each receive a light sequence of three primary lights, so that each DMD can modulates an image by itself. Moreover, during any time intervals, both DMD are operating, so the DMDs can be more fully utilized.

It should be understood that in this embodiment, the wavelength conversion layer and the first light division device may be fixedly connected together. Correspondingly, on the color wheel 703 of the light source system of FIG. 7, the first segment S1 of the light division region will be further divided into a first sub-region and a second sub-region; the first sub-region transmits the red light to output it via the first light path to the DMD 613, and reflects green light to output it via the second light path to the DMD 611, and the second sub-region transmits the green light to output it via the first light path to the DMD 613, and reflects red light to output it via the second light path to the DMD 611.

Sixth Embodiment

Figure 10:
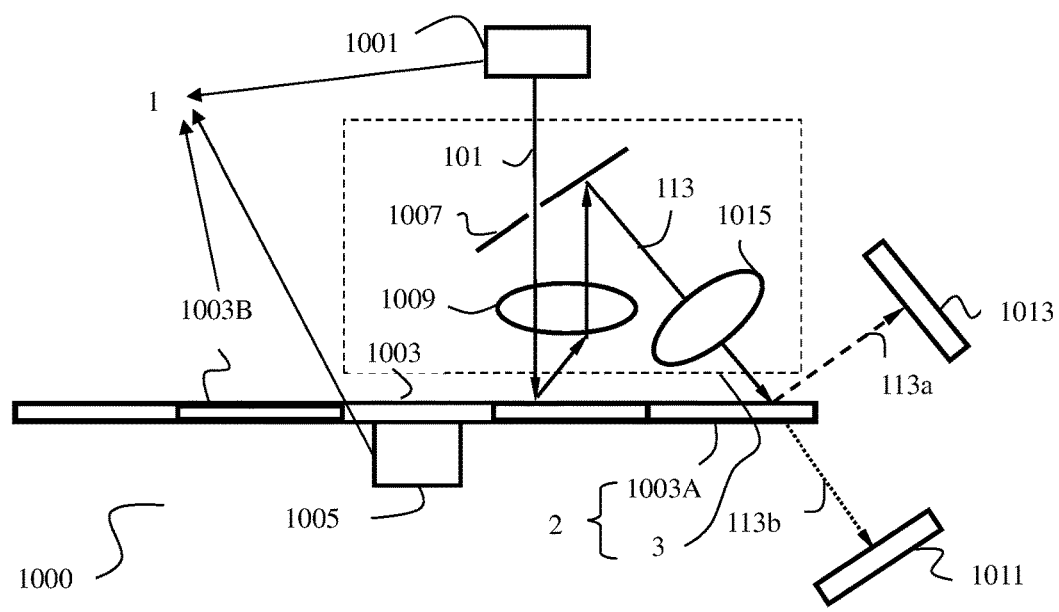
FIG. 10 schematically illustrates a light source system according to another embodiment of the present invention.

The light source system in FIG. 7 shows one of the ways the wavelength conversion layer and first light division device can be fixedly connected. In practice, there are other ways to accomplish this. Refer to FIG. 10, which schematically illustrates a light source system according to another embodiment of the present invention. In this embodiment, the light source system 1000 includes a light generating device 1, a light division system 2, a first spatial light modulator 1011 and a second spatial light modulator 1013. The light generating device 1 includes an excitation light source 1001, a wavelength conversion layer 1003B and a first drive device 1005. The light division system 2 includes a first light division device 1003A and a light guiding device 3. The wavelength conversion layer 1003B and the first light division device 1003A are fixedly connected, and mounted on the color wheel 1003.

Differences between this embodiment and the embodiment of FIG. 7 include:

The wavelength conversion layer 1003B has a reflective type structure, i.e., the incident light path and output path of the wavelength conversion layer 1003B are on the same side. Also, the first segment S1 of the wavelength conversion layer 1003B and the first segment W1 of the light division device 1003A are disposed at 0 degrees from each other, and the second segment S2 and the second segment W2 of the light division device 1003A are also disposed at 0 degrees from each other. I.e., each segment of the light division device and its corresponding segment of wavelength conversion layer are disposed adjacent each other.

The light guiding device 3 includes a reflector with aperture 1007, and collection lenses 1009 and 1015.

In this embodiment, the excitation light source 1001 is a laser source that generates a blue laser light 101. The reflector 1007 is disposed on the path of the blue laser excitation light 101. Because the etendue of laser is relatively small, and the etendue of the converted light is relatively large, the blue laser light 101 passes through the aperture of the reflector 1007, is collected by the lens 1009 and incident on the wavelength conversion layer 1003B. The light sequence outputted by the wavelength conversion layer 1003B is collected by the lens 1009, and a majority of it is reflected by the reflector 1007 to the light division device 1003A. The light spot formed on the light division device 1003A and the light spot formed on the wavelength conversion layer 1003B are located on the same radial line of the color wheel 1003. Compared to the light source system of FIG. 8, the optical arrangement of this embodiment is more compact.

Seventh Embodiment

Figure 11:
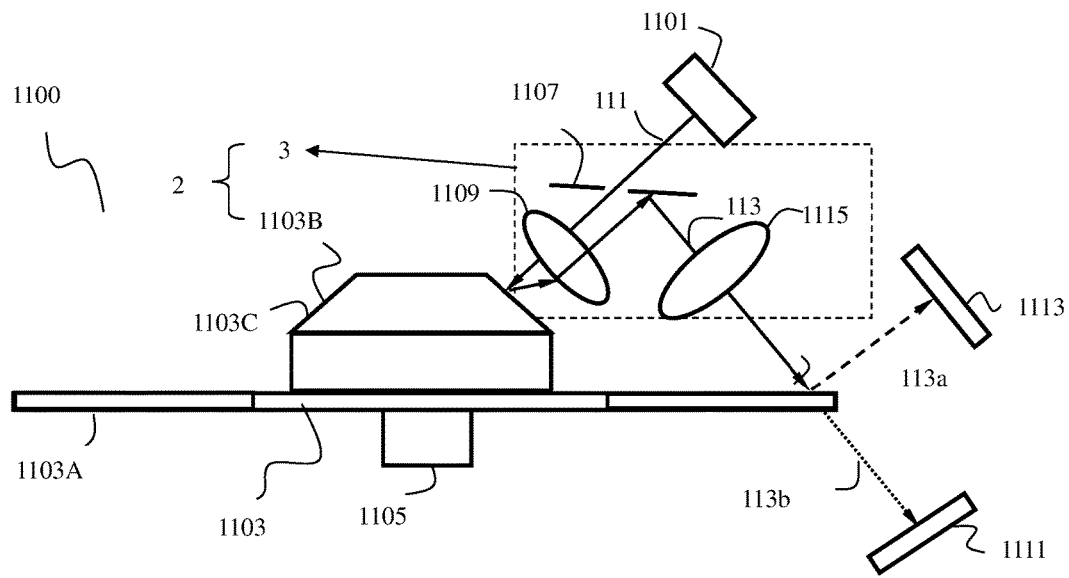
FIG. 11 schematically illustrates a light source system according to another embodiment of the present invention where the wavelength conversion layer is fixedly connected to the first light division device.

Refer to FIG. 11, which schematically illustrates a light source system according to another embodiment where the wavelength conversion layer is fixedly connected to the first light division device. In this embodiment, the light source system 1100 includes a light generating device, a light division system 2, a first spatial light modulator 1111 and a second spatial light modulator 1113. The light generating device includes an excitation light source 1101, a wavelength conversion layer 1103B and a first drive device 1105. The light division system 2 includes a first light division device 1103A and a light guiding device 3. The wavelength conversion layer 1103B and the first light division device 1103A are fixedly connected, and mounted on the color wheel 1103.

Differences between this embodiment and the embodiment of FIG. 10 include:

The wavelength conversion layer 1003B and the light division device 1003A are not two nested ring-shaped regions. Rather, a truncated cone 1103C is provided at the center of the color wheel 1103, and the wavelength conversion layer 1103B is disposed on the slanted side surface of the truncated cone 1103C. The light division device 1103A is disposed in a ring-shaped region of the color wheel 1103. The blue excitation light 111 passes through the aperture of the reflector 1107 and the collection lens 1109 in turn, and illuminates a segment of the wavelength conversion layer 1103B. The output light sequence from the wavelength conversion layer 1103B is collected by lens 1109, and most of it is reflected by the reflector 1107 to a segment of the light division device 1103A that correspond to segment of the wavelength conversion layer 1103B where the excitation light spot is.

Compared to the light source system of FIG. 10, in this embodiment, because the distance between the wavelength conversion layer 1103B and the light division device 1103A is larger, the angle between the incident light to the reflector 1107 and the reflected light 113 from it larger, making it easier to separate the light paths.

In the above embodiments, the second segments of the wavelength conversion layer may carry a second wavelength conversion material, which absorbs the excitation light and convert it to the second light. For example, the excitation light source may generate a UV light, and the first segment of the wavelength conversion layer carries a yellow phosphor to absorbs the UV light and convert it to a yellow light, and the second segment carries a blue phosphor to absorbs the UV light and convert it to a blue light which is the second light.

Eighth Embodiment

The structure of the light source system of this embodiment is basically similar to the ones in the above-described embodiments, the difference being in this embodiment, the light division system further divides the second light into a light in a third wavelength range and a light in a fourth wavelength range and outputs them respectively along the first light path and the second light path. The first spatial light modulator modulates the light in the first wavelength range of the first light and the light in the third wavelength range of the second light which are both output along the first light path, and the second spatial light modulator modulates the light in the first wavelength range of the first light output along the second light path or additionally modulates the light in the third wavelength range of the second light output along the second light path.

Using FIG. 5 as an example, the excitation light source 501 generates a UV light. The first segment of the wavelength conversion layer 503 carries a yellow phosphor to absorb the UV light and generate a yellow light. The second segment carries a blue phosphor to absorb the UV light and generate a blue light which is the second light. Because the blue light generated by the blue phosphor has a relatively wide spectral width, which covers a part of the green spectrum, the filter plate 509 of the light division system is one that can divide the second light i.e. blue light generated by the second segment into light in the third wavelength range and light in the fourth wavelength range, i.e. a second blue light and a second green light. This way, the second blue light and the second green light each has a relatively narrow spectrum and relatively high color purity.

Correspondingly, while the blue converted light generated by the second segment is divided into the second blue light and the second green light, in the light division system shown in FIG. 2, the coating 209a of the second prism 209 may be one that reflects the blue component of the blue converted light and transmits the green component, or one that transmits the blue component and reflects the green component. In the light division system shown in FIG. 5, the filter plate 509 may be one that reflects the second blue light of the blue converted light and transmits the second green light, or one that transmits the second blue light and reflects the second green light. In the above descriptions, the same light division device of the light division system is used to divide both the first light and the second light.

Figure 12:
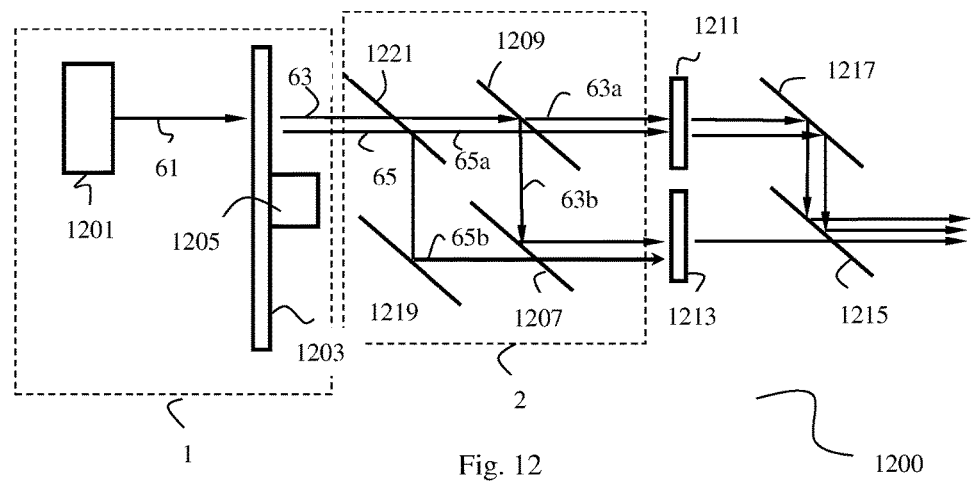
FIG. 12 schematically illustrates a light source system according to another embodiment of the present invention.

In practice, two separate light division devices may be used in the light division system to respectively divide the first light and the second light. Refer to FIG. 12, which schematically illustrates a light source system according to another embodiment of the present invention. In this embodiment, the light source system 1200 includes a light generating device 1, a light division system 2, a first spatial light modulator 1211 and a second spatial light modulator 1213. The light generating device 1 includes an excitation light source 1201, a wavelength conversion layer 1203 and a first drive device 1205.

Differences between this embodiment and the embodiment of FIG. 5 include:

The light division system includes filter plates 1221, 1209 and 1207, and a reflector 1219. The filter plate 1221 is disposed on the output path of the light sequence from the light generating device 1, to reflect the second blue light 65b of the blue converted light and transmit the second green light 65a of the blue converted light and the yellow converted light 63.

The filter plate 1209 is disposed on the path of the transmitted light of the filter plate 1221, to transmit the second green light 65a of the blue converted light and the first green light 63a of the yellow converted light 63, and reflect the red light 63b of the yellow converted light 63. Thus, the second green light 65a transmitted by the filter plate 1209 and the first green light 63a are output to the DMD 1211 along the first light path. The red light 63b reflected by the filter plate 1209 is reflected by the filter plate 1207 to be output to the DMD 1213 along the second light path. The second blue light 65b reflected by the filter plate 1221 is reflected by the reflector 1219 and transmitted by the filter plate 1207 in turn to be output to the DMD 1213 along the second light path.

Figure 13A:
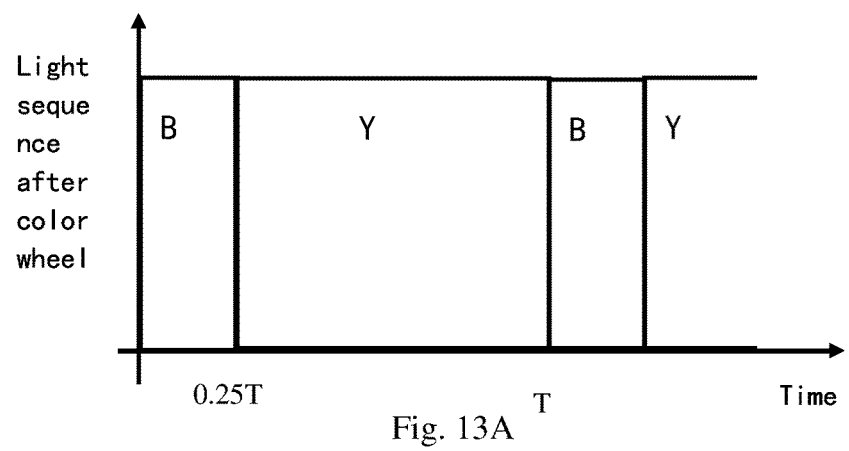
FIG. 13A illustrates an example of the time sequences of the blue and yellow color lights outputted by the wavelength conversion layer 1203 in FIG. 12.
Figure 13B:
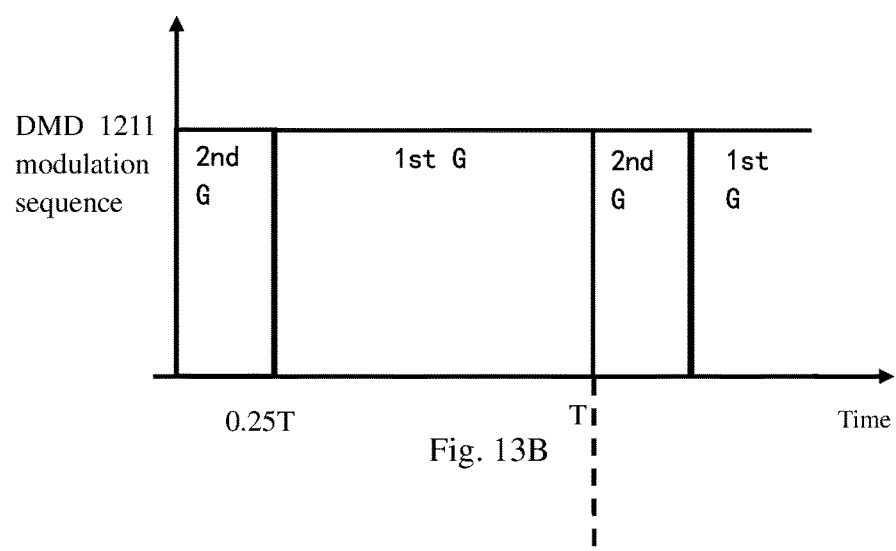
FIGS. 13B and 13C respectively illustrate examples of the modulation time sequences of the DMD 1211 and DMD 1213 in FIG. 12, respectively, for different color lights.
Figure 13C:
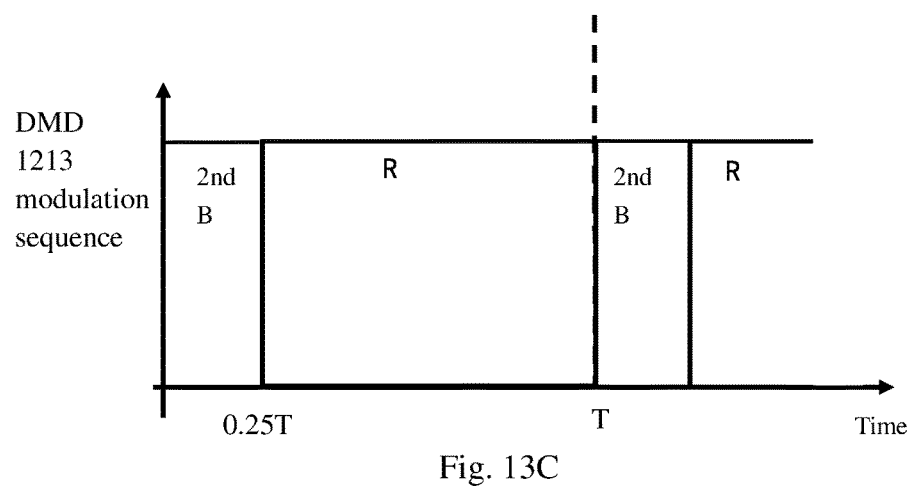

When the second blue light 65b and second green light 65a divided from the blue light 65 are both used for light modulation, because more colors are modulated by the two DMDs, the color range of the modulated light is increased. Correspondingly, the operation sequences of the wavelength conversion layer 1203 and DMDs 1211, 1213 are shown in FIG. 13. FIG. 13A illustrates an example of the time sequences of the blue and yellow lights outputted by the wavelength conversion layer 1203. Within the rotation period T of the wavelength conversion layer 1203, in the first time interval of 0.25T, the wavelength conversion layer 1203 outputs the blue light, and in the later time interval of 0.75T, the wavelength conversion layer 1203 outputs the yellow light. Refer to FIGS. 13B and 13C, which respectively illustrate examples of the modulation time sequences of the DMD 1211 and DMD 1213, respectively, for different color lights. Correspondingly, in the first time interval of 0.25T, the DMD 1211 modulates the second green light, and the DMD 1213 modulates the second blue light. In the later time interval of 0.75T, the DMD 1211 modulates the first green light, and the DMD 1213 modulates the red light.

It should be understood that the second green light can also be discarded and not modulated; i.e., when it enters the DMD 1211, the DMD 1211 does not operate and does not modulate this light.

The above embodiments utilizes the wavelength differences of the lights, and achieves light division or combination using filter plates or filter films to transmit and reflect different color lights. Whether a particular light in a particular light path is transmitted or reflected by a particular filter plate is a design choice. Thus, in all embodiments of the present invention, the filter plates and filter films used in the various light paths are only examples, and other optical structures employing filter plates or filter films can be used to achieve light division and combination.

In this embodiment, the wavelength conversion layer 1203 can have multiple segments carrying different wavelength conversion materials or light transmitting materials; the output converted light from at least one of the segments is divided into two lights of different wavelength ranges so that they are inputted into two spatial light modulators to be modulated.

In this embodiment, the first and second segments can carry wavelength conversion materials that generate other converted lights; they are not limited to the yellow and blue phosphors described above. In addition to phosphors, the wavelength conversion materials can also be quantum dots, fluorescent dyes and other materials with wavelength conversion capabilities.

Ninth Embodiment

Figure 14:
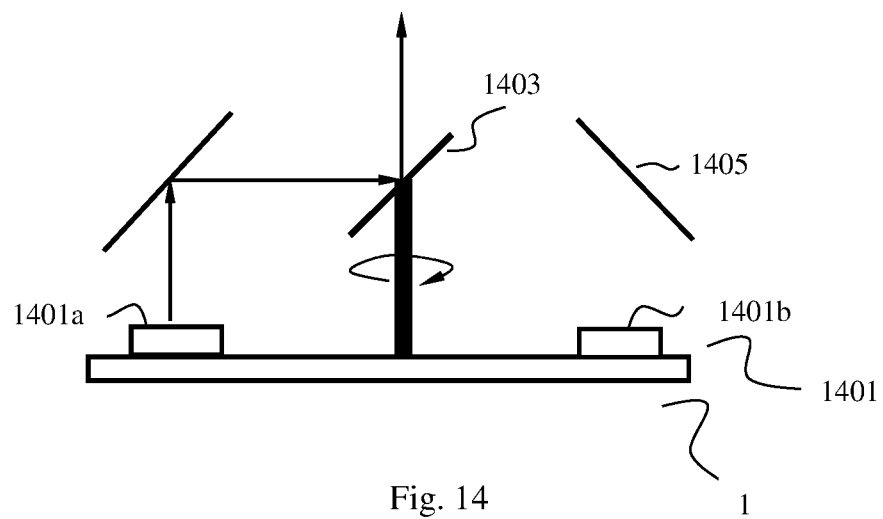
FIG. 14 schematically illustrates a light generating device of a light source system according to another embodiment of the present invention.

Refer to FIG. 14, which schematically illustrates a light generating device of a light source system according to another embodiment of the present invention. Different from the earlier embodiments where the light generating device 1 generates a light sequence using a color wheel, in this embodiment, the light generating device 1 generate a light sequence using a reflector to sequentially reflect different color lights outputted by a LED light wheel. Compared to the first embodiment, this embodiment can reduce cost by using the reflector.

More specifically, the light generating device 1 includes a light source set 1401, a first reflecting device 1405, a second reflecting device 1403 and a second drive device (not shown in the drawings).

The light source set 1401 includes a first light emitting device (in this embodiment, yellow phosphor LEDs 1401a) and a second light emitting device (in this embodiment, blue LEDs 1401b). A phosphor LED refers to an LED coated with a phosphor material, where the light emitted by the LED excites the phosphor to generate a converted light. Commonly used yellow phosphor LEDs use a blue LED coated with a yellow phosphor, which is excited by the blue LED light to generate a yellow light. The yellow phosphor LEDs 1401a and blue LEDs 1401b are arranged in a ring shape, and the output lights of both are parallel to the axis of the ring.

The second reflecting device of this embodiment, which is a rotating mirror 1403 with a reflecting surface 1403a, is disposed on the output side of the light source set 1401, between the first light emitting device 1401a and the second light emitting device 1401b.

The first reflecting device 1405 includes two reflecting elements, which are both reflecting mirrors in this embodiment, respectively disposed on the output paths of the first light emitting device 1401a and the second light emitting device 1401b, for reflecting the light from these light emitting devices to the second reflecting device 1403.

The second drive device drives the second reflecting device 1403 to rotate, so that the reflecting surface 1403a is sequentially disposed on the output path of the two reflecting elements of the first reflecting device 1405, to sequentially reflect and output the light from the first and second light emitting devices.

In practice, the light source set 1401 may include multiple light emitting device arrays, such as LED arrays in this embodiment. Correspondingly, the reflecting device 1405 may include multiple reflecting elements, respectively disposed on the output paths of the multiple light emitting device arrays.

Figure 15:
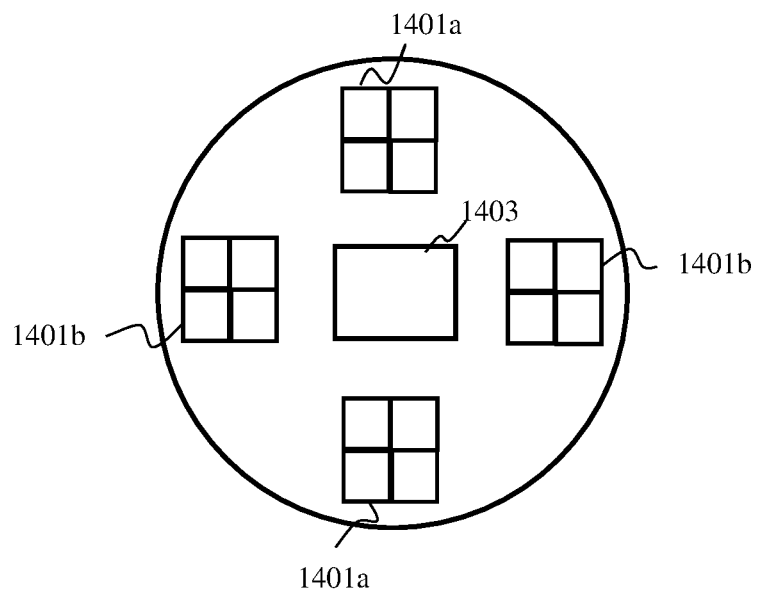
FIG. 15 schematically illustrates the structure of the light generating device set in FIG. 14.

Refer to FIG. 15, which schematically illustrates the structure of the light generating device set 1401 in FIG. 14. Each LED of the light generating device set 1401 are disposed on a disk which has the rotating mirror 1403 at its center; they are arranged in a circumferential direction around the rotating mirror 1403 and arrayed in a radial direction centered at the rotating mirror 1403. In the radial direction, each LED array emits the same color; along the circumferential direction, the yellow phosphor LEDs 1401a and the blue LEDs 1401b are alternatingly arranged.

Tenth Embodiment

Figure 16:
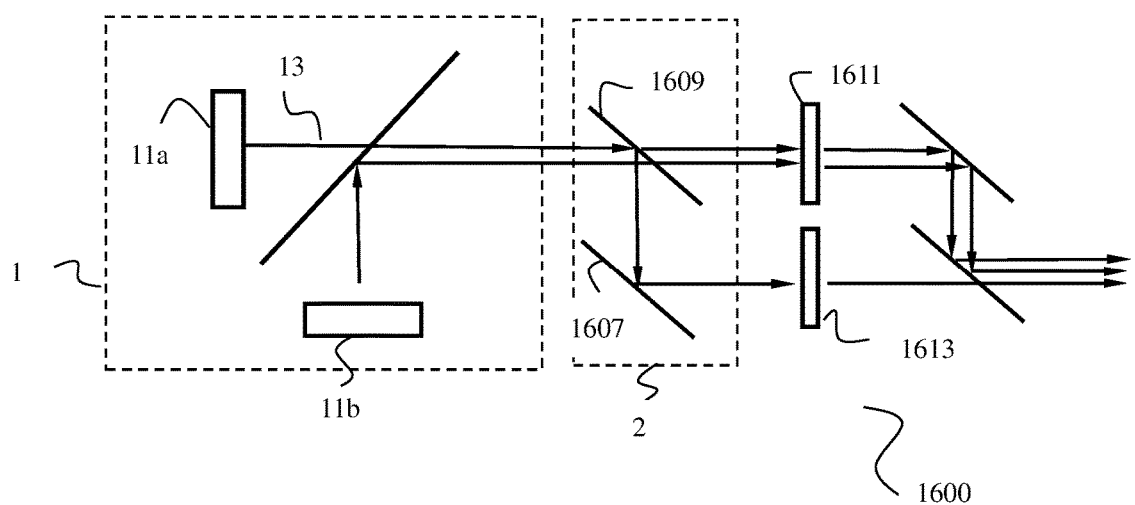
FIG. 16 schematically illustrates a light source system according to another embodiment of the present invention.

Refer to FIG. 16, which schematically illustrates a light source system according to another embodiment of the present invention. The light source system 1600 includes a light generating device 1, a light division system 2, a first spatial light modulator 1611 and a second spatial light modulator 1613.

Differences between this embodiment and the embodiment of FIG. 5 include:

The light generating device 1 includes a first light emitting device, a second light emitting device and a first control device (not shown in the drawings), where the first light emitting device generates a first light and the second light emitting device generates a second light. The first control device alternatingly turns on the first light emitting device and the second light emitting device during at least some time intervals, to generate a light sequence of the first light and second light.

More specifically, the first light emitting device is a yellow LED 11a and the second light emitting device is a blue LED 11b to generate yellow and blue lights, respectively. The first control device controls the turning on and off of the different color LEDs, so that the blue LED 11b and yellow LED 11a are alternatingly turned on to generate a light sequence of yellow and blue lights.

In this embodiment, during certain time intervals the first control device can also control the yellow LED 11a and blue LED 11b to turn on simultaneously. Because the blue light and the green component of the yellow light are both modulated by the DMD 1611, during the time interval when both the yellow LED 11a and blue LED 11b are turned on, the DMD 1611 modulates a combined light of the blue light and green light, i.e., a cyan light, while the DMD 1613 is not affected. During such time interval, because of the combination of the two lights, the DMD 1611 can modulate one more color, increasing the color range of the light modulated by the DMD 1611.

Figure 17A:
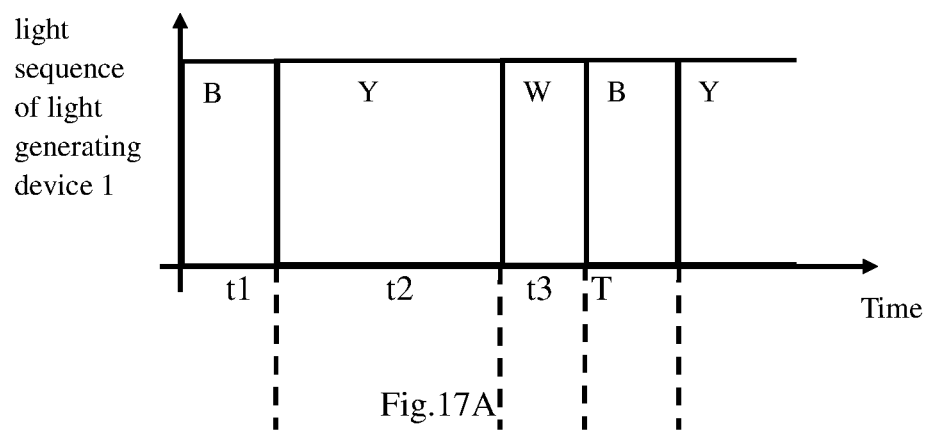
FIG. 17A illustrates an example of the time sequence of the lights outputted by the light source system of FIG. 16.
Figure 17B:
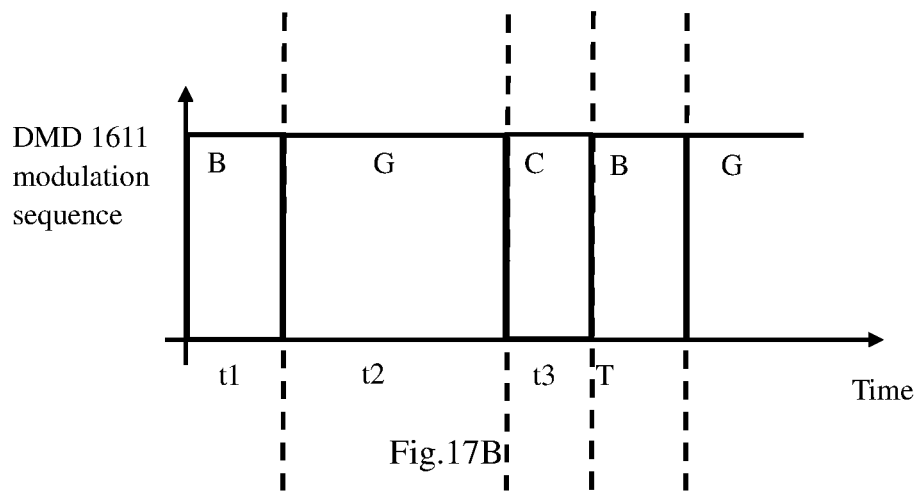
FIGS. 17B and 17C respectively illustrate examples of the modulation time sequences of the DMD 1611 and DMD 1613 in FIG. 16, respectively, for different color lights.
Figure 17C:
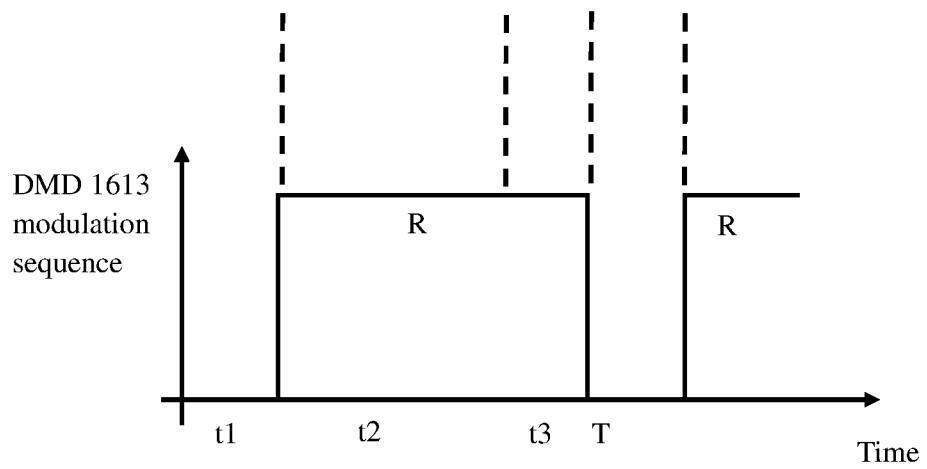

Refer to FIG. 17A, which illustrates an example of the time sequence of the lights outputted by the light source system of FIG. 16. Within a period T, with time interval t1, the blue LED is turned on and the light generating device 1 emits a blue light; with time interval t2, the yellow LED is turned on and the light generating device 1 emits a yellow light; with time interval t3, the blue LED and yellow LED are both turned on and the light generating device 1 emits a combined light of the two lights, i.e. a white light. Refer to FIGS. 17B and 17C, which respectively illustrate examples of the modulation time sequences of the DMD 1611 and DMD 1613, respectively, for different color lights. Correspondingly, in time interval t1, the DMD 1611 modulates the blue light and DMD 1613 does not operate; in time interval t2, the DMD 1611 modulates the green light and DMD 1613 modulates the red light; in time interval t3, the DMD 1611 modulates the cyan light and DMD 1613 modulates the red light.

However, the two color LEDs should not always be simultaneously turned on. This is because there are only two DMDs in the light source system and one of them modulates blue and green lights during different time intervals; so if the yellow LED 11a and blue LED 11b are always turned on simultaneously, there will be no monochromatic images for blue and green and only monochromatic image for cyan.

It should be understood that if the filter plate 1609 in the light division system 2 transmits red light and reflects green light, then the blue light and the red component of the yellow light will both be modulated by DMD 1611, and the green light will be modulated by DMD 1613. In such a case, during the time interval when the yellow LED 11a and blue LED 11b are simultaneously turned on, DMD 1611 modulates the combined light of the blue light and red light, i.e., a purple light, while the DMD 1613 is not affected.

Compared to the other embodiments, in this embodiment, different colored light emitting devices can be turned on simultaneously, so that more colors can be modulated, and the color range of the modulated light is increased.

Eleventh Embodiment

Figure 18:
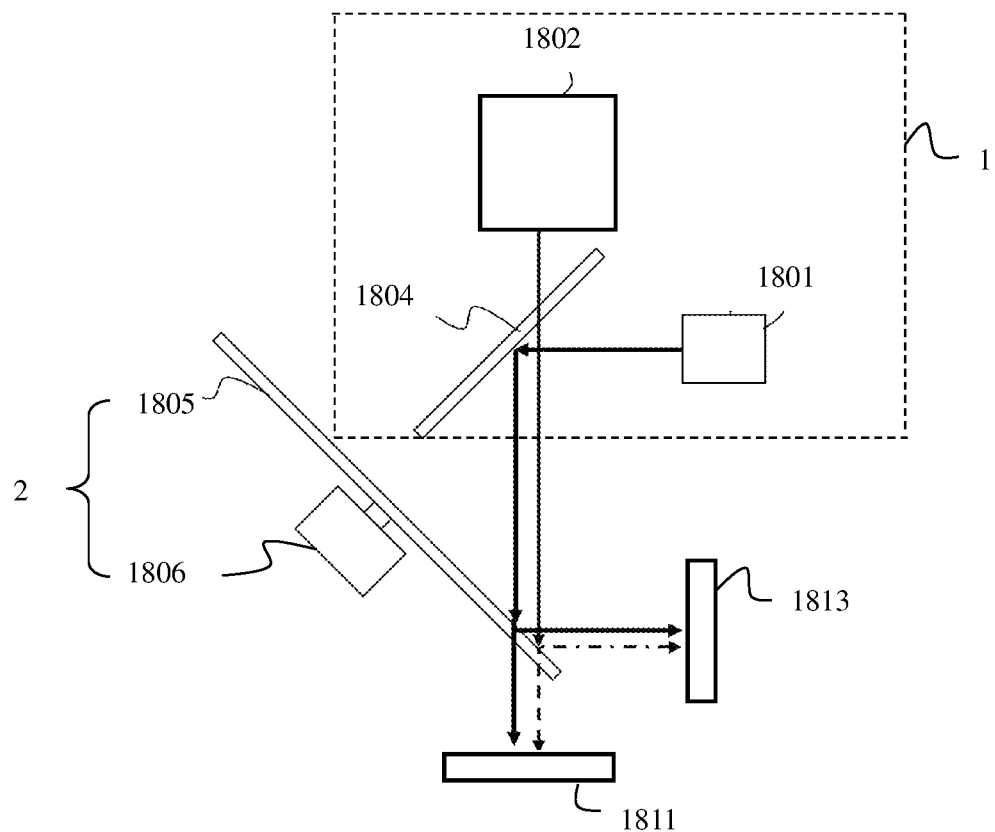
FIG. 18 schematically illustrates a light source system according to another embodiment of the present invention.

Refer to FIG. 18, which schematically illustrates a light source system according to another embodiment of the present invention. The light source system 1800 of this embodiment includes a light generating device 1, a light division system 2, a first spatial light modulator 1811 and a second spatial light modulator 1813.

Differences between this embodiment and the embodiment of FIG. 16 include:

The light division system 2 includes a filter device 1805, a second drive device 1806 for driving the filter device to move, and a first control device (not shown in the drawings). The filter device 1805 includes a first segment, a second segment and a third segment. The first segment transmits a light in a first wavelength range in the first light and outputs it to the first light path, and reflects a light in a second wavelength range and outputs it to the second light path. The second segment reflects the light in the first wavelength range in the first light and outputs it to the second light path, and transmits the light in the second wavelength range and outputs it to the first light path. The third segment transmits a part of the second light and outputs it to the first light path, and reflects a part of the second light and outputs it to the second light path. The first control device controls the second drive device 1806, so that at least a part of the first segment and at least a part of the second segment are sequentially disposed on the output path of the first light, and at least a part of the third segment is disposed on the output path of the second light.

Figure 19:
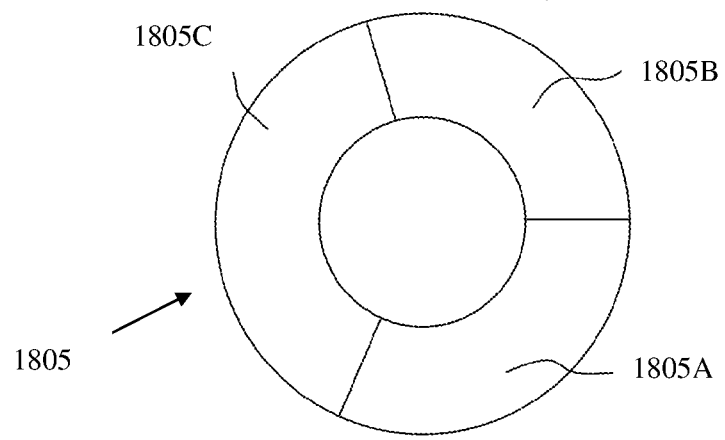
FIG. 19 is a plan view of an example of the light filter in the light source system of FIG. 18.

For example, refer to FIG. 19, which is a plan view of an example of the filter device in the light source system of FIG. 18. The filter device 1805 is disk shaped, and the various segments are distributed in a circumferential direction on the plate. The first segment 1805A of the filter device 1805 transmits a part of the blue light and reflects a part of the blue light; the second segment 1805B transmits green light and reflects red light; and the third segment 1805C reflects green light and transmits red light. The second drive device 1806 is a motor, which drives the filter device 1805 to rotate, so that the various segments are sequentially disposed on the output path of the light generating device 1.

Figure 20:
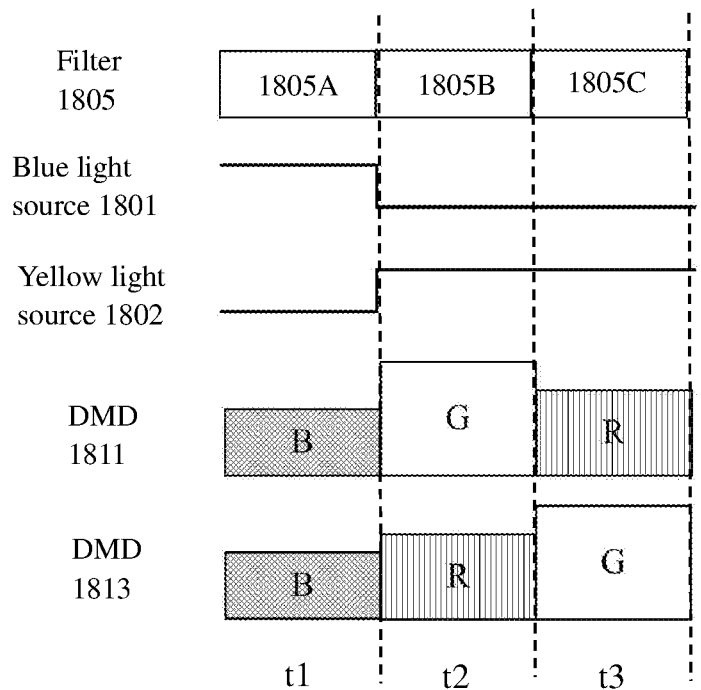
FIG. 20 illustrates an example of the time sequence of the lights outputted by the two light sources and the modulation time sequences of the two DMDs in the light source system of FIG. 18.

Refer to FIG. 20, which illustrates an example of the time sequence of the lights outputted by the two light sources and the modulation time sequences of the two DMDs in the light source system of FIG. 18. Within a modulation period T, in the first time interval t1, the first segment 1805A of the filter device 1805 is disposed on the output path of the light sequence, the blue light source 1801 is turned on and the yellow light source 1802 is turned off, and both DMDs modulate the blue light. In the next time interval t2, the second segment 1805B of the filter device 1805 is disposed on the output path of the light sequence, the yellow light source 1802 is turned on and the blue light source 1801 is turned off, and DMD 1811 modulates the green light and DMD 1813 modulates the red light. In the next time interval t3, the third segment 1805C of the filter device 1805 is disposed on the output path of the light sequence, the yellow light source 1802 is turned on and the blue light source 1801 is turned off, and DMD 1811 modulates the red light and DMD 1813 modulates the green light. This way, the two DMDs can respectively modulate the three primary colors of the light sequence.

Twelfth Embodiment

Figure 21:
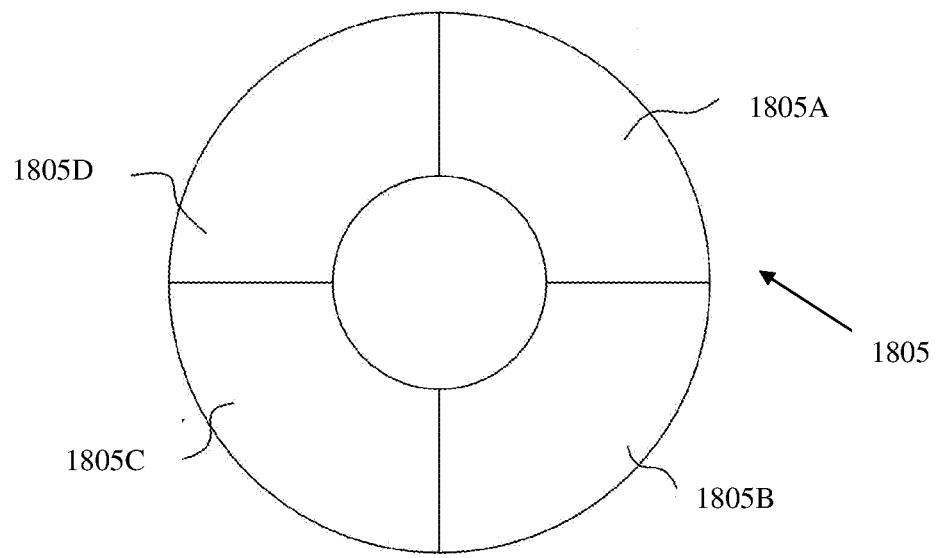
FIG. 21 is a plan view of another example of the light filter in the light source system of FIG. 18.

Refer to FIG. 21, which is a plan view of another example of the light filter in the light source system of FIG. 18.

In this embodiment, the filter device 1805 additionally includes a fourth segment, which reflects blue light and transmits yellow light. Also, different from the light source system shown in FIG. 18, the first segment 1805A transmits blue light and reflects yellow light; when the first segment 1805A and the fourth segment 1805D are disposed on the output path of the light sequence, the blue light source 1801 and the yellow light source 1802 are both turned on. Correspondingly, within a modulation time period T, when the first segment, second segment, third segment and fourth segment of the filter device 1805 are sequentially disposed on the output path of the light sequence, the DMD 1811 sequentially modulates the blue light, green light, red light and yellow light, and the DMD 1813 sequentially modulates the yellow light, red light, green light and blue light. In this embodiment, because the modulated light includes a yellow light, the brightness of the light source system is increased.

In the light source system shown in FIG. 18, a blue light source and a yellow light source are employed and turned on in time intervals corresponding to different segments of the filter device, to provide at least three light sequences for the two DMDs, where the light from the blue light source is divided into two blue light beams for the two DMDs. In practice, two separate blue light sources may also be used to provide two separate blue light beams to be modulated by the two DMDs, as shown below.

Thirteenth Embodiment

Figure 22:
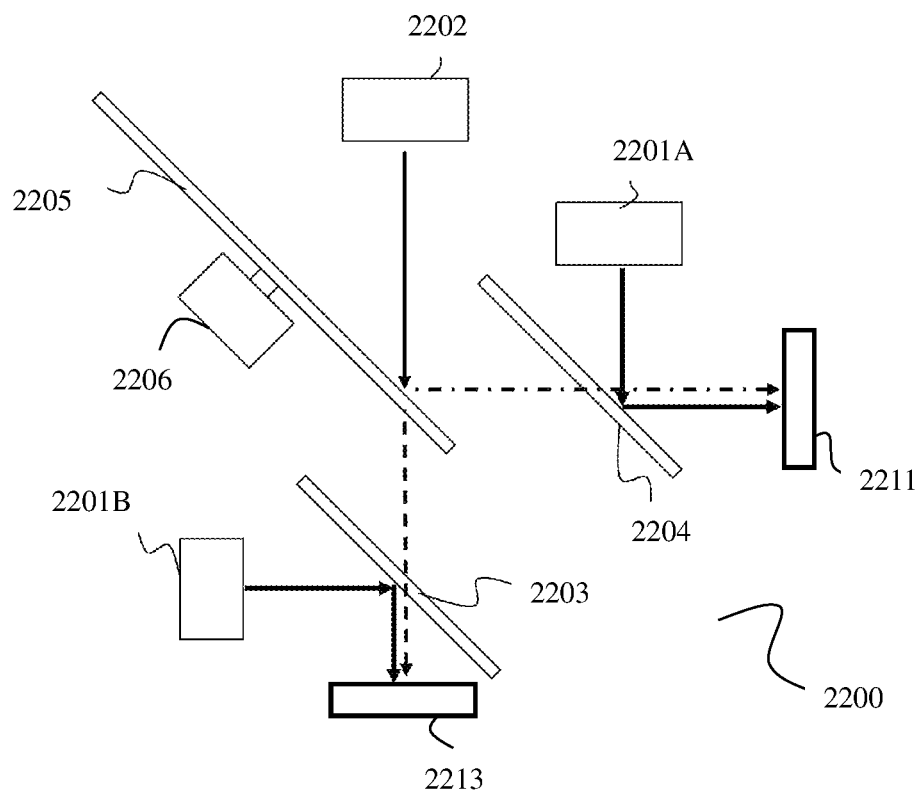
FIG. 22 schematically illustrates a light source system according to another embodiment of the present invention.

Refer to FIG. 22, which schematically illustrates a light source system according to another embodiment of the present invention. In this embodiment the light source system 2200 includes a light generating device, a light division system, a first spatial light modulator 2211 and a second spatial light modulator 2213. The light generating device includes a first light emitting device 2201A, a second light emitting device 2202, a third light emitting device 2201B and a first control device (now shown in the drawings). The light division system includes a filter device 2205, a second drive device 2206, and filter plates 2203 and 2204.

Figure 23:
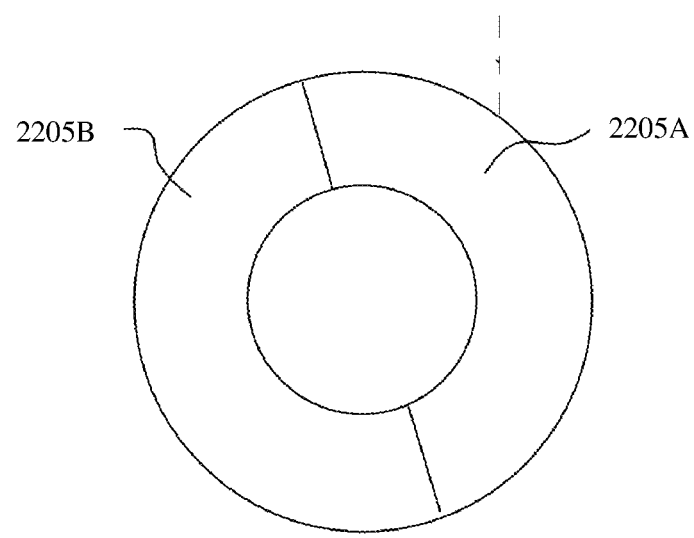
FIG. 23 is a plan view of an example of the light filter in the light source system of FIG. 22.

Differences between this embodiment and the embodiment of FIG. 18 include:

The light generating device additionally includes the third light emitting device, which generates a fourth light during at least a part of the time interval when the second light is generated. In this embodiment, the third light emitting device is a blue light source 2201B. The filter device 2205 of the light division system includes two segments, which are the second segment and third segment in the filter device 1805 of the light source system shown in FIG. 18. Refer to FIG. 23, which is a plan view of an example of the light filter in the light source system of FIG. 22. The filter device 2205 includes a first segment 2205A (i.e. the second segment of the filter device 1805), which transmits green light and reflects red light, and a second segment 2205B (i.e. the third segment of the filter device 1805), which transmits red light and reflects green light.

The yellow light from the yellow light source 2202 (i.e. the first light) is incident on the filter device 2205 at an angle; the light reflected by the filter device 2205 is transmitted through the filter plate 2204 to be output along a first light path to DMD 2211; and the light transmitted by the filter device 2205 is transmitted through the filter plate 2203 to be output along a second light path to DMD 2213. The light emitted by the blue light source 2201A (i.e. the second light) is reflected by the filter plate 2204 to be output along the first light path to DMD 2211. The light emitted by the blue light source 2201B (i.e. the fourth light) is reflected by the filter plate 2203 to be output along the second light path to DMD 2213.

Within a modulation period T, in the first time interval t1, the first control device turns the yellow light source 2202 off, and turns the blue light sources 2201A and 2201B on; DMD 2211 and 2213 both modulate the blue light. In the later time interval t2, the first control device turns the yellow light source 2202 on, and turns the blue light sources 2201A and 2201B off; at least parts of the first segment 2203A and second segment 2203B are sequentially disposed on the output path of the yellow light. The DMD 2211 modulates the red light and green light sequentially output along the first light path, and DMD 2213 modulates the green light and red light sequentially output along the second light path.

In this embodiment, the intensity of the two blue lights modulated by the two DMDs may be controlled depending on practical requirements. Further, the output time durations of the two blue lights blue may be made different, for example, one of the blue light sources may be turned on only during a part of the time interval when the other blue light source is turned on; the specific length of the on time for the blue light sources may depend on the amount of blue light required by the two DMD. Similarly, to adjust the amounts of the green light and red light being modulated, the on times of the yellow light source when the first segment 2203A and second segment 2203B are respectively disposed on the output path of the yellow light (i.e. the first light) may be controlled. It should be understood that one of the blue light sources may be replaced by other colored light emitting devices such as cyan light emitting devices; the corresponding one of the DMDs will then modulate the light sequence of cyan, red and green lights.

It should be understood that, in this embodiment, the filter plates 2203 and 2204 of the light division system are not mandatory; they can be omitted by changing the optical structure of the light source system. For example, the various segments of the filter device 2205 can be made to also transmit the second light and the fourth light (which are both blue in this embodiment), and the light sources 2201A and 2201B can be moved to locations on the two sides of the filter device 2205, so that the output light of the light source 2201A is transmitted through the filter device 2205 and directly enters DMD 2211, and the output light of the light source 2201B is transmitted through the filter device 2205 and directly enters DMD 2213.

Fourteenth Embodiment

Figure 24:
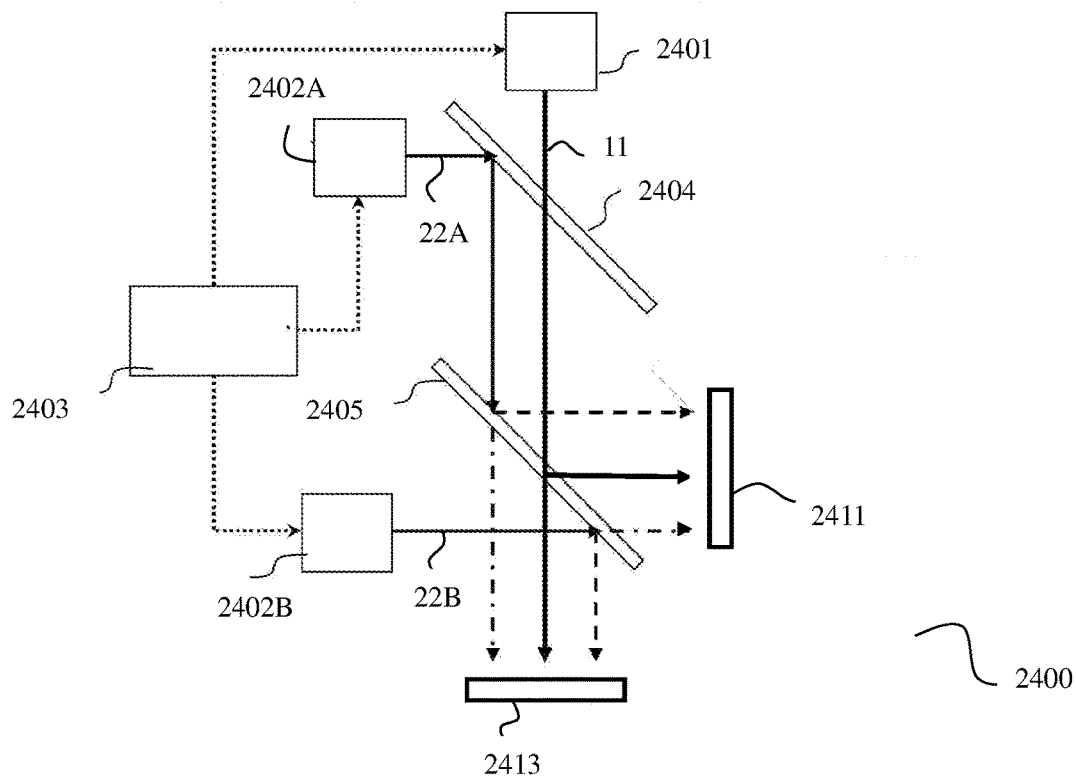
FIG. 24 schematically illustrates a light generating device in a light source system according to another embodiment of the present invention.

Refer to FIG. 24, which schematically illustrates a light generating device in a light source system according to another embodiment of the present invention. In this embodiment the light source system 2400 includes a light generating device, a light division system, a first spatial light modulator 2411 and a second spatial light modulator 2413.

The light generating device sequentially outputs a first light, a second light and a third light. More specifically, the light generating device includes a yellow light source 2402A, a blue light source 2401 and a yellow light source 2402B, which respectively generates yellow light 22A, blue light 11 and yellow light 22B, i.e., first, second and third lights. The light generating device additionally includes a first control device 2403 for controlling the three light sources such that the light generating device sequentially outputs the yellow light 22A, blue light 11 and yellow light 22B.

The light division system divides the second light from the light generating device into a first sub-light and a second sub-light which are respectively output along a first light path and a second light path, and divides the third light from the light generating device into a light in a fifth wavelength range and a light in a sixth wavelength range which are respectively output along the first light path and the second light path. More specifically, the light division system includes filter plate 2404 and 2405. The transmission spectrum of the filter plate 2405 is one that transmits the green component of the yellow light, i.e. the light in the first wavelength range within the first light and the light in the fifth wavelength range within the third light, and reflects red light, i.e. the light in the second wavelength range within the first light and the light in the sixth wavelength range within the third light; it also transmits a part of the blue light and reflects a part of the blue light, i.e. the first sub-light and a second sub-light respectively. The filter plate 2404 transmits blue light and reflects yellow light. The light generated by the blue light source 2401 and yellow light source 2402A are incident onto the filter plate 2404 from its two sides; they are respectively transmitted and reflected by the filter plate 2404 to incident on one side of the filter plate 2405 along the same path. The light from the yellow light source 2402B is incident on the filter plate 2405 on another side. The light reflected by the filter plate 2405 is output to DMD 2411 along the first light path and the light transmitted by the filter plate 2405 is output to DMD 2413 along the second light path.

The first spatial light modulator DMD 2411 modulates the light in the first wavelength range, the first sub-light and light in the fifth wavelength range which are output from the light division system along the first light path. The second spatial light modulator DMD 2413 modulates the light in the second wavelength range, the second sub-light and light in the sixth wavelength range which are output from the light division system along the second light path.

Figure 25:
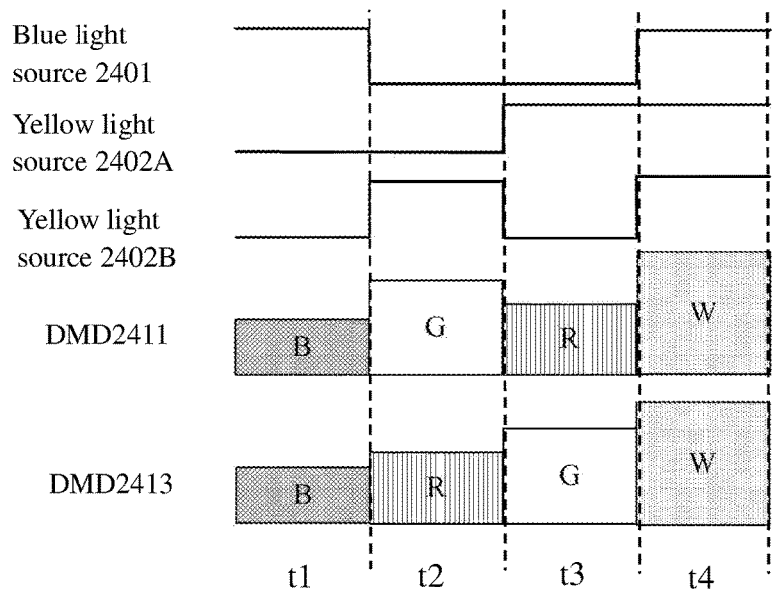
FIG. 25 illustrates an example of the time sequence of the lights outputted by the three light sources and the modulation time sequences of the two DMDs in the light source system of FIG. 24.

Refer to FIG. 25, which illustrates an example of the time sequence of the lights outputted by the three light sources and the modulation time sequences of the two DMDs in the light source system of FIG. 24. Within a modulation time period T, during the first time interval t1, the blue light source 2401 is turned on, and the two yellow light sources are turned off; both DMDs modulate the blue light. During the next time interval t2, the yellow light source 2402B is turned on, and the other two light sources are turned off; DMD 2411 modulates the green light, and DMD 2413 modulates the red lights. During the next time interval t3, the yellow light source 2402A is turned on, and the other two light sources are turned off; DMD 2411 modulates the red light, and DMD 2413 modulates the green lights. This way, the two DMDs can each modulate a light sequence of the three primary colors.

In this embodiment, the modulation time period T can further include a time interval t4, during which all three light sources are turned on; the two DMDs both modulate a combination light of the blue light and yellow light, i.e., a white light. This way, the brightness of the light source system can be increased. In this embodiment, the relative lengths of the time intervals t1, t2, t3 and t4 can be adjusted based on the practical needs of different colored lights.

Compared to other embodiments described earlier, in this embodiment, the brightness of the two yellow light sources can be controlled to adjustment the brightness of the red and green light modulated by the two DMDs; this also eliminates the need for a second drive device for driving the filter device. Meanwhile, because the turning on of the light sources does not need to be synchronized with the rotation of the filter device, it makes it easier to control the sequential turning on of the different light sources, and makes it easier to adjust the amount of different color lights modulated by the DMDs.

It should be understood that, in this embodiment, one of the yellow light sources can be replaced by a light emitting device of a third color. Correspondingly, the transmission spectrum of the filter plate 2405 can be made to transmit light of one wavelength range in the third color light and reflect light of another wavelength range in the third color light.

In this embodiment, the light generating device can alternatively use an excitation light source to excite a rotating color wheel to generate three beams of light sequences, and the light division system can use a filter wheel that rotate in synchrony with the color wheel to achieve light division of the three beams. Such devices are already described in the earlier embodiments; this can be achieved by combining the light generating devices and light division systems of the earlier embodiments in various ways, which will not be described in detail here.

Fifteenth Embodiment

Figure 26:
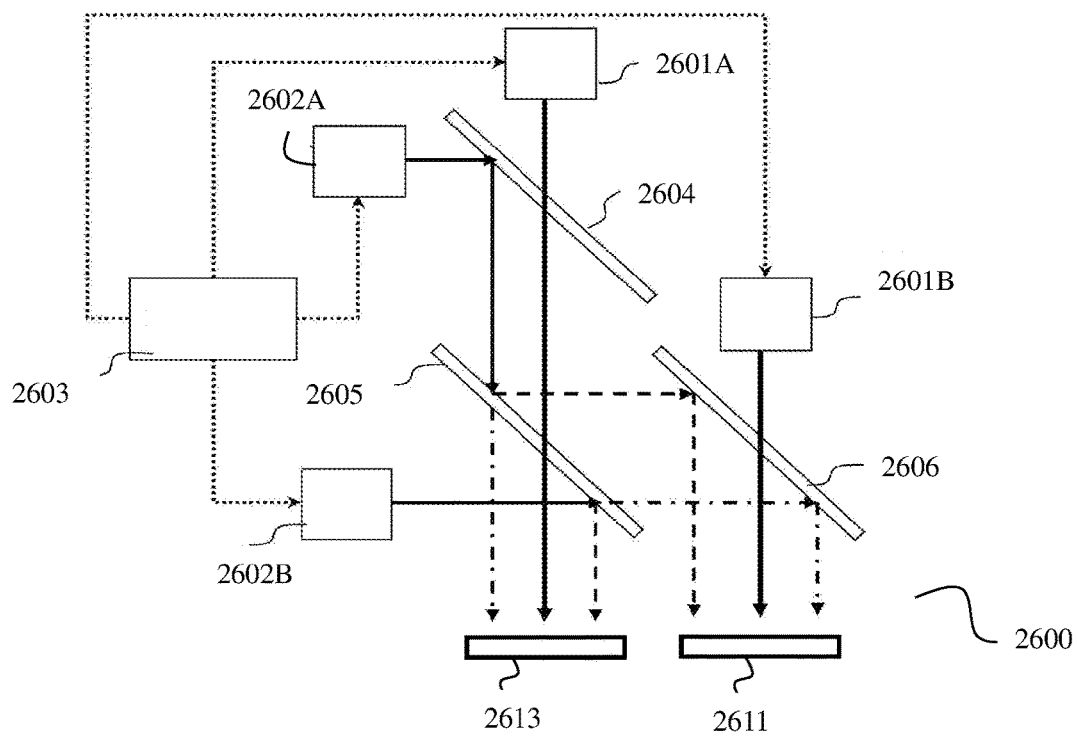
FIG. 26 schematically illustrates a light generating device in a light source system according to another embodiment of the present invention.

Refer to FIG. 26, which schematically illustrates a light generating device in a light source system according to another embodiment of the present invention. In this embodiment, the light source system 2600 includes a light generating device, a light division system, a first spatial light modulator 2611 and a second spatial light modulator 2613. The light generating device includes blue light sources 2601A and 2601B, yellow light sources 2602A and 2602B, and a first control device 2603. The light division system includes filter plates 2604 and 2605.

Differences between this embodiment and the embodiment of FIG. 24 include:

In this embodiment, the light generating device additionally includes blue light source 2601B, which together with the blue light source 2601A provides separate blue lights to the two DMDs.

Compared to the filter plate 2405 in the light source system of FIG. 24 which divides the lights from the two yellow light sources, in this embodiment, the filter plate 2605 which divides the lights from the two yellow light sources is one that transmits green light and reflects blue and red lights, and the blue light generated by the blue light source 2601A is transmitted through the filter plate 2605 to be output to DMD 2613 along the second light path. Meanwhile, the filter plate 2606 is disposed on the output path of the reflected light of the filter plate 2605, for transmitting the blue light and reflecting other lights. The sequence of red and green lights reflected by the filter plate 2605 is reflected by the filter plate 2606 to be output to DMD 2611 along the first light path, and the blue light from the blue light source 2501B is transmitted through the filter plate 2606 to be output to DMD 2611 along the first light path.

Figure 27:
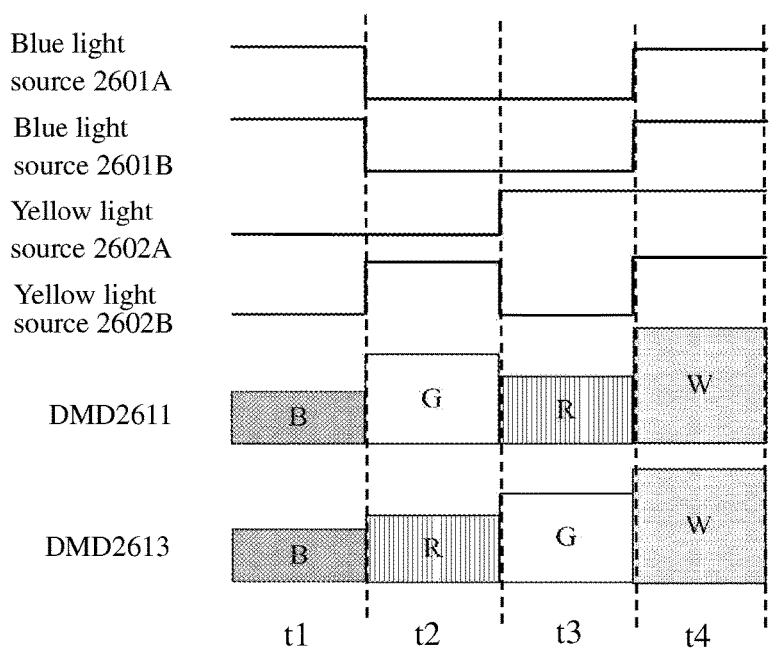
FIG. 27 illustrates an example of the time sequence of the lights outputted by the four light sources and the modulation time sequences of the two DMDs in the light source system of FIG. 26.

Refer to FIG. 27, which illustrates an example of the time sequence of the lights outputted by the four light sources and the modulation time sequences of the two DMDs in the light source system of FIG. 26. Within a modulation time period T, during the first time interval t1, the first control device controls the two blue light sources to turn on and the two yellow light sources to turn off; the two DMDs both modulate blue lights. During the next time interval t2, the yellow light source 2602B is turned on and the other three light sources are turned off; DMD 2611 modulates green light, and DMD 2613 modulates red light. During the next time interval t3, the yellow light source 2602A is turned on and the other light sources are turned off; DMD 2611 modulates red light, and DMD 2613 modulates green light. This way, the two DMDs can each modulate a light sequence of the three primary colors.

It should be understood that one of the blue light sources can alternatively be turned on during only a part of the time interval t1, and the length of the on time can be controlled based on the amount of blue light needed.

Preferably, the modulation time period T can further include a time interval t4, during which all three light sources are turned on; the two DMDs both modulate a combination light of the blue light and yellow light, i.e., a white light. This way, the brightness of the light source system can be increased. In this embodiment, the relative lengths of the time intervals t1, t2, t3 and t4 can be adjusted based on the practical needs of different colored lights.

Compared to light source system of FIG. 24, in this embodiment, two blue lights are used, so that the intensity of the two blue lights modulated by the two DMDs and the respective modulating time lengths can be controlled to better suit the need of practical applications.

In the above embodiment, the transmission spectrum of each filter plate, the timing control of each light source, the modulation timing of the DMDs, and the optical path designs are not limited to the above examples; those familiar with the relevant art can make adjustments based on the principles described here.

Sixteenth Embodiment

Figure 28:
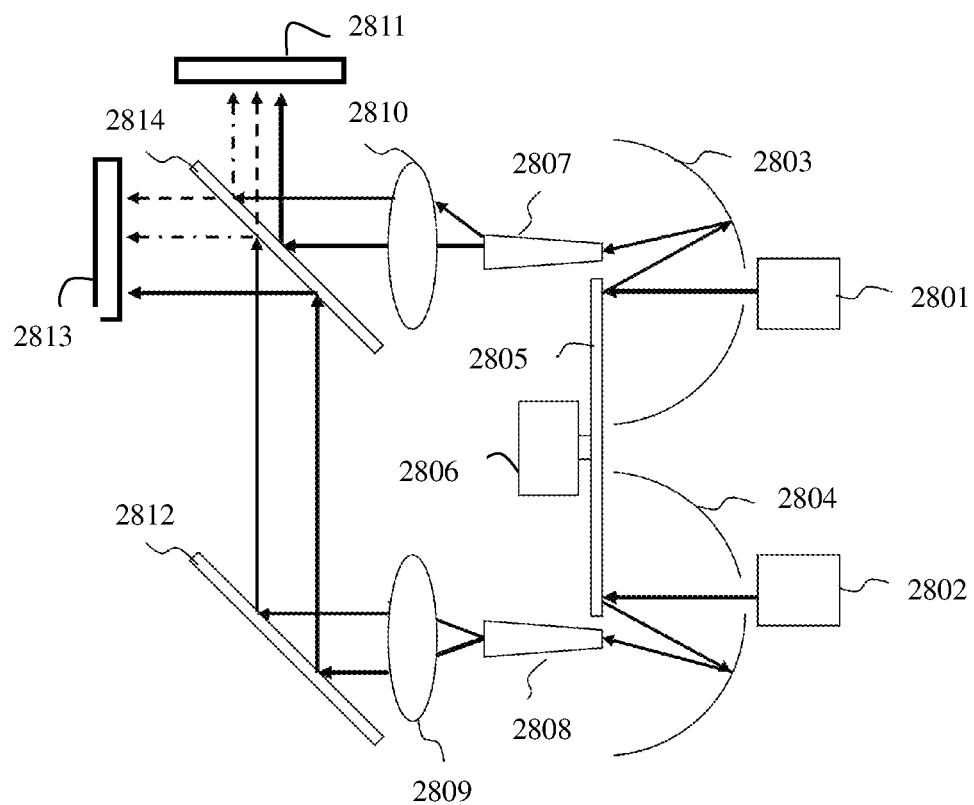
FIG. 28 schematically illustrates a light generating device in a light source system according to another embodiment of the present invention.

Refer to FIG. 28, which schematically illustrates a light generating device in a light source system according to another embodiment of the present invention. In this embodiment, the light source system 2800 includes a light generating device, a light division system, a first spatial light modulator 2811 and a second spatial light modulator 2813. The light generating device includes excitation light sources 2801 and 2802, a wavelength conversion device 2805, a first drive device 2806 and a first control device (not shown in the drawings). The light division system includes a filter plate 2814 and a reflecting mirror 2812.

Differences between this embodiment and the embodiment of FIG. 24 include:

The light generating device of the light source system in FIG. 24 generates a light sequence by sequentially turning on four light sources, while the light generating device in this embodiment combines using a color wheel and sequentially turning on light sources to generate a light sequence, as described below.

The wavelength conversion layer 2805 includes a first segment 2805A, second segment 2805B, third segment 2805C and a fourth segment 2805D, respectively carry first, second, third and fourth functional materials, to absorb the excitation light and respectively generate first, second, third and fourth lights. In this embodiment, the two excitation light sources are both UV sources; the first and third segments carry a yellow wavelength conversion material, and the second and fourth segments carry a blue wavelength conversion material. Within one time interval, the first segment and third segment are respectively disposed on the output paths of the excitation lights of the two excitation light sources, and within another time interval, the second segment and fourth segment are respectively disposed on the output paths of the excitation lights of the two excitation light sources.

The first drive device 2806 drives the wavelength conversion layer 2805, such that the light spots formed by the excitation lights on the wavelength conversion material layer 2805 fall on the wavelength conversion material layer along predetermined paths. Meanwhile, the first control device controls the two excitation light sources, such that during at least a part of the time interval when the first segment 2805A and the third segment 2805C are located on the path of the excitation lights, the two excitation light sources are alternatingly turned on, and during at least a part of the time interval when the second segment 2805B and the fourth segment 2805D are located on the path of the excitation lights, the two excitation light sources are simultaneously turned on.

Figure 29:
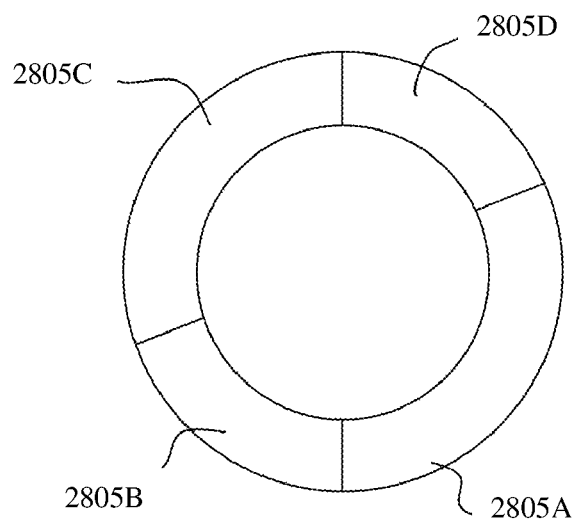
FIG. 29 is a plan view of an example of a wavelength conversion layer in the light source system of FIG. 28.

One specific example is described with reference to FIG. 29, which is a plan view of an example of a wavelength conversion layer in the light source system of FIG. 28. In this embodiment, the wavelength conversion layer 2805 has a disk shape, and the first segment 2805A and third segment 2805C are located at 180 degree locations with respect to each other, and the second segment 2805B and fourth segment 2805D are located at 180 degree locations with respect to each other. The first drive device 2806 is a motor that drives the wavelength conversion material layer to rotate. A line that connects the light spots formed by the two excitation lights on the wavelength conversion material layer 2805 passes through the center of the disk, so that the two segments disposed at 180 degrees from each other will be simultaneously located on the output paths of the two excitation lights from the two excitation light source.

In this embodiment, the wavelength conversion material layer 2805 is reflective type, i.e., the paths of the excitation light and the converted light are located on the same side of the wavelength conversion material layer 2805. This may be implemented by providing a reflecting mirror or reflecting film on the side of the wavelength conversion material layer 2805 that faces away from the excitation light source. This is well-known technology and will not be described in detail here.

Two reflective cups 2803 and 2804 are provided on the output paths of the wavelength conversion material layer 2805, to respectively collect the converted lights generated by the wavelength conversion material after absorbing the excitation lights from the excitation light sources 2801 and 2802, referred to as the first converted light and second converted light, respectively. Each of the reflective cup has an aperture for transmitting the excitation light from the corresponding excitation light sources. Each reflective cups separates its corresponding excitation light and converted light using the difference in etendue of the two lights. It should be understood that when the wavelength conversion material layer is transmission type, i.e., when the light paths of the excitation light and converted light are on the two different sides of the wavelength conversion material layer, the reflective cups are not necessary. However, in the present embodiment, reflective type wavelength conversion materials and reflective cups are used, which can reduce loss of the light beam, whereby increasing the light utilization efficiency.

The light division system divides each of the first light and third light into two lights of different wavelength ranges and outputs them along the first light path and the second light path, and also outputs the second light and the fourth light along the first light path and the second light path. In this embodiment, the reflector 2812 is located on the output path of the second converted light, and the first converted light and the reflected second converted light from the reflector 2812 are incident on the two different sides of filter plate 2814. The filter plate 2814 reflects the green component of the yellow lights (i.e. the first light and the third light) and transmits the red component, and reflects blue light (i.e. the second light and the fourth light) to be output along the first light path and the second light path. DMD 2811 modulates the light output along the first light path by the filter plate 2814, and DMD 2813 modulates the light output along the second light path by the filter plate 2814.

Preferably, the first converted light is collected by the reflective cup 2803 and sent to light homogenizing device 2807 to be homogenized, and then passes through the condenser lens 2810 to be output to the filter plate 2814. Similarly, the second converted light is collected by the reflective cup 2804 and sent to light homogenizing device 2808 to be homogenized, and then passes through the condenser lens 2809 to be output to the filter plate 2812. This way, the utilization efficiency of the first excitation light and second excitation light, reducing light loss.

Figure 30:
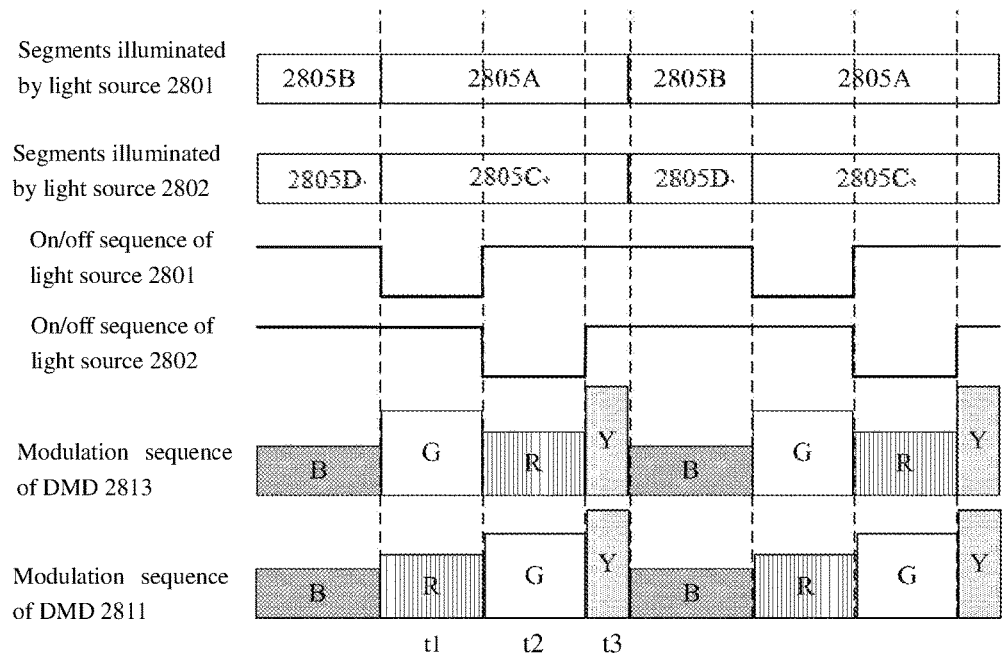
FIG. 30 illustrates an operating sequence of the light source system of FIG. 28.

Refer to FIG. 30, which illustrates an operating sequence of the light source system of FIG. 28. Within a rotation period T of the wavelength conversion material layer 2805, when the second segment 2805B and the fourth segment 2805D are respectively located on the light paths of the two excitation lights, the first control device controls the two excitation light sources to turn on, and the two DMDs both receive the blue light reflected from the filter plate 2814. When the first segment 2805A and the third segment 2805C are respectively located on the light paths of the two excitation lights, during the first time interval t1, the first control device turns on the excitation light source 2802 and turns off the excitation light source 2801, so DMD 2813 receives the green light and DMD 2811 receives the red light; during the later time integral t2, the first control device turns on the excitation light source 2801 and turns off the excitation light source 2802, so DMD 2813 receives the red light and DMD 2811 receives the green light.

Preferably, when the first segment 2805A and the third segment 2805C are respectively located on the light paths of the two excitation lights, during a time interval t3, the first control device turns on both excitation light sources 2801 and 2802, so both DMD receives the combined light of the red light and green light, i.e. a yellow light. This increases the brightness of the light source system.

In this embodiment, when the second segment 2805B and the fourth segment 2805D are respectively located on the light paths of the two excitation light sources, the lengths of the on times of the of the two excitation light sources can be adjusted, so that the amounts of the blue lights received by the two DMDs can be adjusted, which in turn adjusts the color of the output image of the light source system. Similarly, when the first segment 2805A and the third segment 2805C are respectively located on the light paths of the two excitation light sources, the lengths of the on times of the of the two excitation light sources can be adjusted, so that the amounts of the sequential red and green lights received by the two DMDs can be adjusted.

In this embodiment, the two excitation light sources may alternatively be blue light sources, and the second segment 2805B and the fourth segments 2805D are each provided with a reflective region to reflect the blue lights. When the excitation light sources are laser sources, preferably, the second segment 2805B and the fourth segments 2805D are each provided with a scattering material to eliminate coherence of the blue light.

Figure 31:
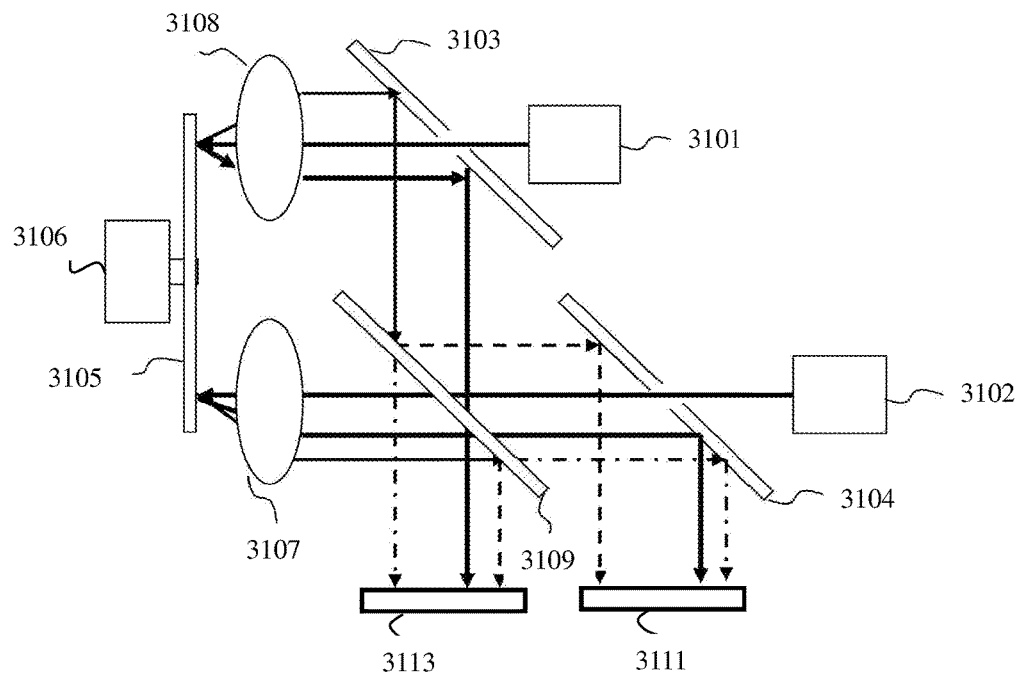
FIG. 31 schematically illustrates a light generating device in a light source system according to another embodiment of the present invention.

In this embodiment, the first light, second light, third light and fourth light may also be different color lights, and the spectra of the four lights and the transmission spectra of the filter plates used to divide the first light and third light may be determined based on the need for the two DMDs, Seventeenth Embodiment Refer to FIG. 31, which schematically illustrates a light generating device in a light source system according to another embodiment of the present invention. In this embodiment, the light source system includes light generating device, light division system, a first spatial light modulator 3111 and a second spatial light modulator 3113. The light generating device includes excitation light sources 3101 and 3102, a wavelength conversion layer 3105, a first drive device 3106 and a first control device (not shown in the drawings). The light division system includes a filter plate 3109 and reflecting mirrors with apertures 3103 and 3104.

Differences between this embodiment and the embodiment of FIG. 28 include:

In the light source system of FIG. 28, a reflective cup is provided on the output path of the wavelength conversion material layer 2805, so that the light sequence generated by the light emitting device is reflect by the reflective cup and before entering the light division system. In this embodiment, instead of a reflective cup on the output path of the wavelength conversion material layer 3105, the light division system is directly provided.

The filter plate 3109 of the light division system transmits the green component of the yellow light and reflects the red component of the yellow light, and also transmits the second light and the fourth light (which are both blue lights in this embodiment). The excitation light generated by the first excitation light source 3101 passes through the aperture of the reflecting mirror 3103 and the collimating lens 3108 to be incident on the wavelength conversion layer 3105. The first converted light outputted from the wavelength conversion layer 3105 passes through the collimating lens 3108 and is reflected by reflecting mirror 3103 to filter plate 3109. The excitation light generated by the second excitation light source 3102 passes through the aperture of the reflecting mirror 3104, filter plate 3109 and the collimating lens 3107 to be incident on the wavelength conversion layer 3105. The second converted light outputted from the wavelength conversion layer 3105 passes through the collimating lens 3107 and is incident on filter plate 3109.

The operating sequence of the light source system of FIG. 31 is as follows. Within the rotation period T of the wavelength conversion layer 3105, when the second segment 2805B and the fourth segment 2805D are respectively located on the light path of the two excitation lights, the first control device turns on the two excitation light source; DMD 3113 receives the blue light transmitted through filter plate 3109, and DMD 3111 receives the blue light transmitted through filter plate 3109 and reflected by reflecting mirror 3104. When the first segment 2805A and the third segment 2805C are respectively located on the light path of the two excitation lights, during a first time interval t1, the first control device turns on excitation light source 3101 and turns off excitation light source 3102; DMD 3113 receives a red light and DMD 3111 receives a green light. During a later time interval t2, the first control device turns on the excitation light source 3102 and turns off excitation light source 3101; DMD 3113 receives a green light and DMD 3111 receives a red light.

For convenience of description, the above embodiments are illustrated by using the examples where the first light and third light are yellow lights and the second light and fourth lights are blue lights. In practice, these four light beams can be other color lights, not limited to the above description. Correspondingly, the transmission spectrum of the filter plates or filter devices of the light division system can be designed based on the requirements of the four lights.

In the above various embodiment, in the multi-segmented wavelength conversion layers and multi-segmented filter devices, the arrangements of the multiple segments on the wavelength conversion layers or filter devices are not necessarily a circumferential distribution around the rotation center; rather, the segments can be band shaped parallel regions, or other arrangements. Correspondingly, the drive device that drives the wavelength conversion device or filter device may be a device that drives a linear translation motion or other drive devices, such that the light spots formed by the light beams on the wavelength conversion layer or the filter device fall on the wavelength conversion device or filter device along a linear path or other predetermined paths.

Figure 32:
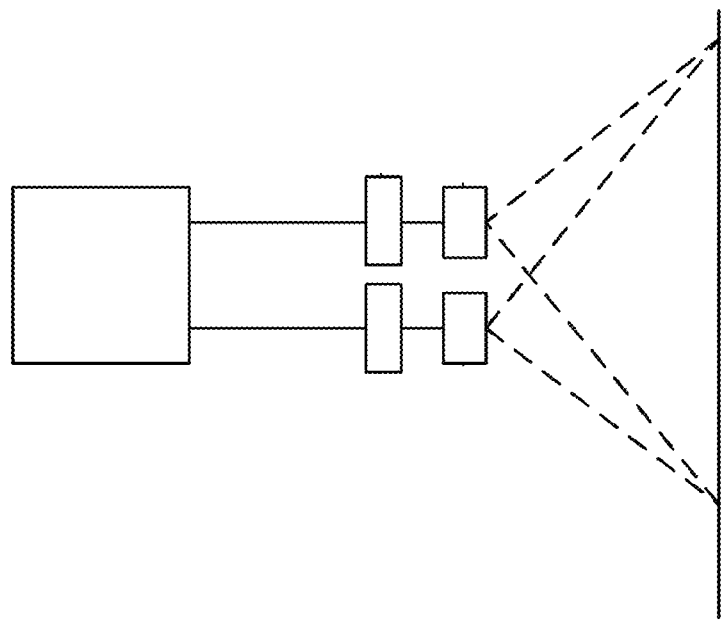
FIG. 32 schematically illustrates the structure of a light source system according to another embodiment of the present invention.
Figure 33:
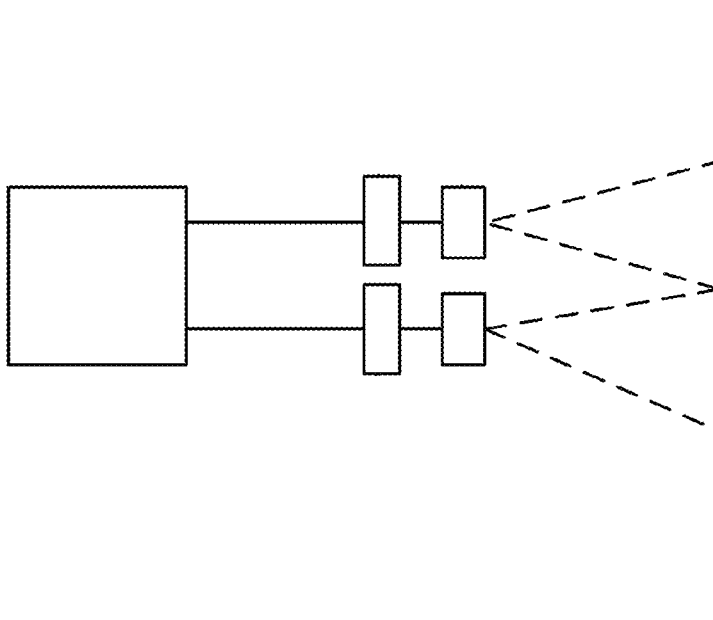
FIG. 33 schematically illustrates the structure of a light source system according to another embodiment of the present invention.

In the above embodiments, the output light of the two DMDs can be projected to the same display region, to form an image, as shown in FIG. 32, which schematically illustrates the structure of a light source system according to another embodiment of the present invention. The output light of the two DMD can alternatively be projected to two display regions to form two images, as shown in FIG. 33, which schematically illustrates the structure of a light source system according to another embodiment of the present invention.

The various embodiments of the present invention are described progressively, where each embodiment is described by emphasizing its differences form some earlier embodiments. For portions of the various embodiments that are similar to each other, references can be made to each other.

The present invention also provides a projection system, including a light source system, which can have structures and functions as described in the above embodiments. The projection system can employ various display technologies, such as LCD (liquid crystal display) projection technology, DLP (digital light processor) technology, etc. Further, the above-described light source system can also be used for lighting, such as stage lighting.

The above-described embodiments illustrate the present invention but do not limit it to the particular embodiments. Equivalent structures and equivalent processes can be used which are based on the description here; the invention may also be applied to other related technical fields. All of these are within the scope of the present invention.

What is claimed is:

1. A light source system, comprising:
a light generating device which includes an excitation light source, a wavelength conversion layer and a first drive device;
wherein the excitation light source generates an excitation light;
wherein the wavelength conversion layer has a first segment and a second segment, the first segment carrying a first wavelength conversion material which absorbs the excitation light and emits a first light, the second segment emits a second light;
wherein the first drive device drives the wavelength conversion layer such that a light spot formed by the excitation light on the wavelength conversion layer falls on the wavelength conversion layer along a predetermined path and the wavelength conversion layer sequentially generates the first light and the second light;
a light division system which includes a first light division device having a first segment and a second segment, the first segment dividing the first light from the light generating device into a light in a first wavelength range and a light in a second wavelength range and outputting them respectively along a first light path and a second light path, the second segment outputting at least a part of the second light from the light generating device along the first light path;
a first spatial light modulator, which modulates the lights outputted along the first light path of the light division system; and
a second spatial light modulator, which modulates at least a part of the lights outputted along the second light path of the light division system;
wherein the wavelength conversion layer and the first light division device are fixedly connected and mounted on a color wheel; and
wherein the light generating device further includes a light guiding device which guides the sequence of output lights from the first segment and the second segment of the wavelength conversion layer respectively to the first segment and the second segment of the first light division device.

2. The light source system of claim 1, wherein the color wheel is provided with two concentric and nested ring-shaped regions, and wherein one ring-shaped region is the first light division device, and the other ring-shaped region is the wavelength conversion layer.

3. The light source system of claim 1, wherein the first light and the second light exit the side of the wavelength conversion layer that faces away from the excitation light, and wherein the light guiding device is disposed on the side of the light generating device that faces away from the excitation light.

4. The light source system of claim 3, wherein the first segment of the wavelength conversion layer is disposed at a 180-degree position from the first segment of the light division device with respect to the ring center, and the second segment of the wavelength conversion layer is disposed at a 180-degree position from the second segment of the light division device with respect to the ring center.

5. The light source system of claim 4, wherein the light guiding device includes a lens and two reflectors, the emitting first and second light is collected by the lens and then reflected in turn by the two reflectors, and then incident on the first segment of the light division device at a predetermined angle.

6. The light source system of claim 1, wherein the first segment of the first light division device transmits the light in a first wavelength range and reflects the light in a second wavelength range and outputs them respectively along a first light path and a second light path, and wherein the second segment of the first light division device transmits the second light along the first light path.

7. The light source system of claim 6, wherein the light in a first wavelength range is green light and the light in a second wavelength range is red light, and the first light is yellow light and the second light is blue light.

8. The light source system of claim 1, wherein the wavelength conversion layer has a reflective type structure, and wherein the light guiding device is disposed on the side of the light generating device that faces the excitation light.

9. The light source system of claim 8, wherein the first segment of the wavelength conversion layer is disposed at a 0-degree position from the first segment of the light division device with respect to the ring center, and the second segment of the wavelength conversion layer is disposed at a 0-degree position from the second segment of the light division device with respect to the ring center.

10. The light source system of claim 9, wherein the light guiding device includes a reflector with aperture disposed on the path of the excitation light; and
wherein the excitation light passes through the aperture of the reflector, is incident on the wavelength conversion layer to output a light sequence of the first light and the second light; and
wherein a majority of the light sequence is reflected by the reflector to the light division device.

11. The light source system of claim 10, wherein the excitation light source is a laser source.

12. The light source system of claim 1, wherein a truncated cone is provided at the center of the color wheel, and the wavelength conversion layer is disposed on the slanted side surface of the truncated cone; and
wherein the light division device is disposed in a ring-shaped region of the color wheel.

13. The light source system of claim 1, wherein the second segment of the wavelength conversion layer carries a second wavelength conversion material which absorbs the excitation light and emits a second light.

14. The light source system of claim 13, wherein the first wavelength conversion material is a yellow phosphor and the second wavelength conversion material is a blue phosphor.

15. The light source system of claim 1, wherein the excitation light source generates a UV light.

16. The light source system of claim 1, wherein the second segment of the wavelength conversion layer is a light transmitting segment which transmits the excitation light as a second light or a light reflecting segment which reflects the excitation light as a second light, and the excitation light source generates a blue light.

17. The light source system of claim 1, wherein the wavelength conversion layer further includes a third segment, the third segment carrying a third wavelength conversion material which absorbs the excitation light and emits a third light;
wherein the first drive device drives the wavelength conversion layer to sequentially generates the first light, the second light and the third light; and
wherein the first light division device further includes a third segment, and the second segment divides the second light into a first sub-light and a second sub-light and respectively outputs them along the first light path and the second light path, and the third segment divides the third light into a light in a fifth wavelength range and a light in a sixth wavelength range and respectively outputs them along the first light path and the second light path;
wherein the first spatial light modulator modulates the light in the first wavelength range, the first sub-light and the light in the fifth wavelength range output from the light division system along the first light path; and
wherein the second spatial light modulator modulates the light in the second wavelength range, the second sub-light and the light in the sixth wavelength range output from the light division system along the second light path.

18. The light source system of claim 17, wherein the first light and the third light are yellow light and the second light is blue light.

19. A projection system comprising the light source system of claim 1.

* * * * *